United States Patent
Zhang et al.

(10) Patent No.: US 12,388,746 B2
(45) Date of Patent: Aug. 12, 2025

(54) PACKET PROCESSING METHOD, APPARATUS, AND SYSTEM, DEVICE, AND COMPUTER-READABLE STORAGE MEDIUM

(71) Applicant: HUAWEI TECHNOLOGIES CO., LTD., Guangdong (CN)

(72) Inventors: Yinxi Zhang, Nanjing (CN); Yuquan Ding, Suzhou (CN); Yubo Si, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 18/489,081

(22) Filed: Oct. 18, 2023

(65) Prior Publication Data

US 2024/0048481 A1    Feb. 8, 2024

Related U.S. Application Data

(63) Continuation of application No. PCT/CN2021/133885, filed on Nov. 29, 2021.

(30) Foreign Application Priority Data

Apr. 20, 2021 (CN) .......................... 202110425399.8

(51) Int. Cl.
  *H04L 45/00* (2022.01)
  *H04L 12/46* (2006.01)
  *H04L 45/74* (2022.01)

(52) U.S. Cl.
  CPC ........ *H04L 45/566* (2013.01); *H04L 12/4633* (2013.01); *H04L 45/74* (2013.01)

(58) Field of Classification Search
  CPC ... H04L 45/566; H04L 12/4633; H04L 45/74; H04L 2101/622; H04L 12/4641;
  (Continued)

(56) References Cited

U.S. PATENT DOCUMENTS 9,246,820 B1 *   1/2016  Singh .................... H04L 47/125
10,148,550 B1 *  12/2018  Murphy .................. H04L 45/22
(Continued)

FOREIGN PATENT DOCUMENTS

| | | |
|---|---|---|
| CN | 1770766 A | 5/2006 |
| CN | 103973569 A | 8/2014 |
| EP | 2579514 A1 | 4/2013 |

OTHER PUBLICATIONS

Extended European Search Report for EP Application No. 21937696.9 dated Sep. 5, 2024, 14 pages.

*Primary Examiner* — Benjamin M Thieu

(57) ABSTRACT

The technology of this application relates to a packet processing method, apparatus, and system, a device, and a computer-readable storage medium, and pertains to the field of communication technologies. The technology provides a manner of setting, in a packet header of a second packet, a target identifier that indicates to decapsulate the packet. In this way, after the second packet is obtained from a first packet, a first original packet is obtained from the second packet when it is determined that the packet header of the second packet includes the target identifier. Then, a layer of encapsulation is directly performed on the first original packet, to obtain a first target packet used for sending. In this case, there is no need to perform a plurality of layers of encapsulation. Therefore, packet transmission efficiency is improved.

18 Claims, 13 Drawing Sheets

(58) Field of Classification Search
CPC .... H04L 61/103; H04L 69/22; H04W 84/045; H04W 84/105; H04W 76/12; H04W 28/065

See application file for complete search history.

(56) References Cited

U.S. PATENT DOCUMENTS

| | | | |
|---|---|---|---|
| 10,938,685 B2* | 3/2021 | Indiresan | H04L 63/0272 |
| 2010/0014532 A1 | 1/2010 | Wakayama et al. | |
| 2013/0044636 A1* | 2/2013 | Koponen | H04L 45/54 |
| | | | 370/254 |
| 2013/0083782 A1* | 4/2013 | Murphy | H04L 61/103 |
| | | | 370/392 |
| 2014/0195666 A1* | 7/2014 | Dumitriu | H04L 43/55 |
| | | | 709/223 |
| 2017/0373883 A1 | 12/2017 | Guo | |

* cited by examiner

PACKET PROCESSING METHOD, APPARATUS, AND SYSTEM, DEVICE, AND COMPUTER-READABLE STORAGE MEDIUM

CROSS-REFERENCE TO RELATED APPLICATIONS

This application is a continuation of International Application No. PCT/CN2021/133885, filed on Nov. 29, 2021, which claims priority to Chinese Patent Application No. 202110425399.8, filed on Apr. 20, 2021. The disclosures of the aforementioned applications are hereby incorporated by reference in their entireties.

TECHNICAL FIELD

This application relates to the field of communication technologies, and in particular, to a packet processing method, apparatus, and system, a device, and a computer-readable storage medium.

BACKGROUND

Customer premises equipment (CPE), which are device(s) that can convert a wired network into a wireless network, are widely used in scenarios in which wired network construction is inconvenient. In this way, terminal devices can be connected to a network in a wireless connection manner. This reduces difficulty in network construction and improves flexibility of network reconstruction.

When a terminal device accesses a network over a CPE, network authentication, such as access authentication and application service authentication, needs to be performed on the network. In the network authentication process, the terminal device sends a packet to the CPE, and the CPE transparently transmits, to an access controller (AC) that serves as a network authentication point, the packet sent by the terminal device. The AC performs network authentication on the terminal device based on a received packet.

In conventional technology, a generic routing encapsulation (GRE) tunnel is established between a CPE and an AC, and a packet is encapsulated in a GRE encapsulation manner, to implement transparent packet transmission.

However, there is further an access point device (AP) between the CPE and the AC, and a tunnel established between the AC and the AP is a control and provisioning of wireless access points (CAPWAP) protocol tunnel. Therefore, a packet transmitted between the CPE and the AC needs to be encapsulated through two layers of encapsulation: GRE encapsulation performed by the CPE and CAPWAP encapsulation performed by the AP. This affects packet transmission efficiency to some extent. Consequently, low packet transmission efficiency is caused.

SUMMARY

This application provides a packet processing method, apparatus, and system, a device, and a computer-readable storage medium, to improve packet transmission efficiency. This application provides the following solutions:

According to a first aspect, a packet processing method is provided. The method is performed by an access point (AP) device, and includes:

receiving a first packet from a customer premises equipment (CPE), and obtaining a second packet from the first packet;

obtaining a first original packet from the second packet if a packet header of the second packet includes a target identifier, where the target identifier indicates to decapsulate the second packet; and sending a first target packet, where the first target packet is obtained by encapsulating the first original packet.

The solution in this embodiment of this application provides a manner of setting, in the packet header of the second packet, the target identifier that indicates to decapsulate the packet. In this way, after the second packet is obtained from the first packet, the first original packet is obtained from the second packet when it is determined that the packet header of the second packet includes the target identifier. Then, one layer of encapsulation is directly performed on the first original packet, to obtain the first target packet used for sending. In this case, there is no need to perform a plurality of layers of encapsulation. Therefore, packet transmission efficiency is improved.

In a possible implementation, the target identifier is carried in a destination address field in the packet header, and the destination address field is a destination internet protocol IP address field or a destination media access control (MAC) address field.

The destination IP address field and the destination MAC address field are used as two optional fields for the destination address field, so that the target identifier is carried in the destination address field. In this way, two optional implementations in which the target identifier is carried in the destination IP address field and the target identifier is carried in the destination MAC address field are provided. This improves flexibility of a packet processing process.

In a possible implementation, the obtaining a first original packet from the second packet if a packet header of the second packet includes a target identifier includes:

if the packet header of the second packet includes the target identifier, removing the packet header of the second packet to obtain the first original packet.

When the packet header of the second packet includes the target identifier, the first original packet that serves as a body of the second packet can be directly obtained by removing the packet header of the second packet. In this way, the second packet is decapsulated.

In a possible implementation, the obtaining a second packet from the first packet includes:

removing a packet header of the first packet to obtain the second packet.

The first original packet that serves as a body of the first packet can be directly obtained by removing the packet header of the first packet. In this way, the first packet is decapsulated.

In a possible implementation, the first packet is encapsulated by using a wireless network protocol, the second packet includes a generic routing encapsulation GRE header, and the first target packet is encapsulated by using a control and provisioning of wireless access points CAPWAP protocol.

Packets are encapsulated by using the wireless network protocol, the GRE protocol, and the CAPWAP protocol to ensure that packets obtained through encapsulation comply with formats of packets transmitted between the CPE and AP and between the AP and an AC. Then, packet transmission is performed based on the packets obtained through encapsulation. In this way, transparent packet transmission is implemented.

In a possible implementation, the method further includes:

receiving a third packet from an access controller (AC);

obtaining a second original packet from the third packet; and sending a second target packet, where the second target packet is obtained by encapsulating a fourth packet, and the fourth packet is obtained by encapsulating the second original packet.

When the third packet from the AC is received, the second original packet is obtained from the third packet, the second original packet is encapsulated to obtain the second target packet, and then the second target packet is sent, to implement packet transmission.

In a possible implementation, the obtaining a second original packet from the third packet includes:

removing a packet header of the third packet to obtain the second original packet.

The second original packet that serves as a body of the third packet can be directly obtained by removing the packet header of the third packet. In this way, the third packet is decapsulated.

In a possible implementation, the third packet is encapsulated by using the CAPWAP protocol, the fourth packet is encapsulated by using a GRE protocol, and the second target packet is encapsulated by using the wireless network protocol.

Packets are encapsulated by using the wireless network protocol, the GRE protocol, and the CAPWAP protocol to ensure that packets obtained through encapsulation comply with formats of packets transmitted between the CPE and AP and between the AP and the AC. Then, packet transmission is performed based on the packets obtained through encapsulation. In this way, transparent packet transmission is implemented.

According to a second aspect, a packet processing method is provided. The method is performed by a CPE, and includes:

receiving a first original packet from a first station device;

encapsulating the first original packet to obtain a first packet, where the first packet includes a second packet, a packet header of the second packet includes a target identifier, and the target identifier indicates to decapsulate the second packet; and sending the first packet.

According to the solution provided in this embodiment of this application, when the first original packet sent by the first station device is encapsulated, the target identifier that indicates to decapsulate a packet is set in an encapsulated packet header, and then packet transmission is performed by sending a packet obtained through encapsulation. In this way, when determining that the packet header includes the target identifier, a device that receives the packet obtained through encapsulation can decapsulate the packet to obtain the first original packet, and then performs one layer of encapsulation on the first original packet, so that a packet obtained through one layer of encapsulated can be used in a packet transmission process. In this case, there is no need to perform a plurality of layers of encapsulation. Therefore, packet transmission efficiency is improved.

In a possible implementation, the target identifier is carried in a destination address field in the packet header of the second packet, and the destination address field is a destination IP address field or a destination MAC address field.

The destination IP address field and the destination MAC address field are used as two optional fields for the destination address field, so that the target identifier is carried in the destination address field. In this way, two optional implementations in which the target identifier is carried in the destination IP address field and the target identifier is carried in the destination MAC address field are provided. This improves flexibility of a packet processing process. In a possible implementation, the encapsulating the first original packet to obtain a first packet includes:

encapsulating an intermediate packet header for the first original packet, where a destination address field in the intermediate packet header carries the target identifier;

removing a destination MAC address field and a source MAC address field from the intermediate packet header to obtain the second packet; and encapsulating a first packet header for the second packet to obtain the first packet.

When the intermediate packet header is encapsulated for the first original packet, the destination address field of the intermediate packet header is set to carry the target identifier. In addition, the destination MAC address field and the source MAC address field are first removed from the intermediate packet header, and then the first packet header is encapsulated, which complies with an encapsulation manner of a network transmission protocol. The first packet obtained through encapsulation can be transmitted between the CPE and the AP, which ensures packet normal transmission. In addition, when determining that the destination address field carries the target identifier, a device that receives the first packet can directly obtain the first original packet from the received first packet, and then performs one layer of encapsulation on the first original packet, so that a packet obtained through one layer of encapsulated can be used in a packet transmission process. In this case, there is no need to perform a plurality of layers of encapsulation. Therefore, packet transmission efficiency is improved.

In a possible implementation, the second packet includes a GRE header, and the first packet is encapsulated by using a wireless network protocol.

Packets are encapsulated by using the wireless network protocol and the GRE protocol to ensure that packets obtained through encapsulation comply with formats of packets transmitted between the CPE and the AP. Then, packet transmission is performed based on the packets obtained through encapsulation. In this way, transparent packet transmission is implemented.

In a possible implementation, the method further includes:

receiving a second target packet from an access point (AP) device;

obtaining a second original packet from the second target packet, where the second target packet is obtained by performing two layers of encapsulation on the second original packet; and sending the second original packet.

After the second target packet from the AP is received, the second original packet is obtained from the second target packet, and then the second original packet is sent, to implement transparent packet transmission.

In a possible implementation, the obtaining a second original packet from the second target packet includes:

removing two packet headers in the second target packet to obtain the second original packet.

The second target packet is obtained by performing two layers of encapsulation on the second original packet. Therefore, the second original packet that serves as a body of the second target packet can be directly obtained by removing the two packet headers in the second target packet. In this way, the second target packet is decapsulated.

In a possible implementation, the two layers of encapsulation include wireless network protocol encapsulation and GRE protocol encapsulation.

Packets are encapsulated by using the wireless network protocol and the GRE protocol to ensure that packets obtained through encapsulation comply with formats of packets transmitted between the CPE and the AP. Then, packet transmission is performed based on the packets obtained through encapsulation. In this way, transparent packet transmission is implemented.

According to a third aspect, a packet processing apparatus is provided, where the apparatus is used in an AP. The packet processing apparatus has a function of implementing the packet processing method according to the first aspect or any one of the possible implementations of the first aspect. The packet processing apparatus includes at least one module, and the at least one module is configured to implement the packet processing method according to the first aspect or any one of the possible implementations of the first aspect. For details of the packet processing apparatus provided in the third aspect, refer to the first aspect or any one of the possible implementations of the first aspect.

According to a fourth aspect, a packet processing apparatus is provided, where the apparatus is used in a CPE. The packet processing apparatus has a function of implementing the packet processing method according to the second aspect or any one of the possible implementations of the second aspect. The packet processing apparatus includes at least one module, and the at least one module is configured to implement the packet processing method according to the second aspect or any one of the possible implementations of the second aspect. For details of the packet processing apparatus provided in the fourth aspect, refer to the second aspect or any one of the possible implementations of the second aspect.

According to a fifth aspect, a packet processing system is provided, where the packet processing system includes an access point (AP) device and a customer premises equipment (CPE). The access point AP device is configured to perform the packet processing method according to the first aspect or any one of the possible implementations of the first aspect, and the customer premises equipment CPE is configured to perform the packet processing method according to the second aspect or any one of the possible implementations of the second aspect.

According to a sixth aspect, an access point AP device is provided. The access point AP device includes a processor and a memory. The memory stores at least one instruction, and the instruction is read by the processor, so that the access point (AP) device performs the packet processing method according to the first aspect or any one of the possible implementations of the first aspect.

According to a seventh aspect, a customer premises equipment (CPE) is provided, where the customer premises equipment (CPE) includes a processor and a memory. The memory stores at least one instruction, and the instruction is read by the processor, so that the customer premises equipment (CPE) performs the packet processing method according to the second aspect or any one of the possible implementations of the second aspect.

According to an eighth aspect, a computer-readable storage medium is provided. The storage medium stores at least one instruction, and the instruction is read by a processor of an access point (AP) device, so that the AP device performs the packet processing method according to the first aspect or any one of the possible implementations of the first aspect; or the instruction is read by a processor of a customer premises equipment (CPE), so that the customer premises equipment performs the packet processing method according to the second aspect or any one of the possible implementations of the second aspect.

According to a ninth aspect, a computer program product is provided. When the computer program product is run on an access point (AP) device, the AP device performs the packet processing method according to the first aspect or any one of the possible implementations of the first aspect. Alternatively, when the computer program product is run on a customer premises equipment (CPE), the CPE performs the packet processing method according to the second aspect or any one of the possible implementations of the second aspect.

According to a tenth aspect, a chip is provided. The chip includes a processing circuit and an input/output interface that is internally connected to and communicates with the processing circuit. The processing circuit and the input/output interface each are configured to implement the packet processing method according to the first aspect or any one of the possible implementations of the first aspect. Alternatively, the processing circuit and the input/output interface each are configured to implement the packet processing method according to the second aspect or any one of the possible implementations of the second aspect.

DESCRIPTION OF EMBODIMENTS

In this application, terms such as "first" and "second" are used to distinguish between same or similar items whose effects and functions are basically the same. It should be understood that there is no logical or time sequence dependency between "first", "second", and "n$^{th}$", and a quantity and an execution sequence are not limited. It should also be understood that although the terms such as "first" and "second" are used in the following descriptions to describe various elements, these elements should not be limited by the terms. These terms are merely used to distinguish one element from another element. For example, in a possible case without departing from the scope of various examples, a first original packet is referred to as a second original packet; and similarly, the second original packet is referred to as the first original packet. Both the first original packet and the second original packet are original data packets. In addition, in some possible cases, the first original packet and the second original packet are independent and different original data packets.

It should be further understood that the term "if" may be interpreted as "when" ("when" or "upon"), "in response to determining", or "in response to detecting".

The solutions provided in embodiments of this application can be applied to a plurality of types of network scenarios, such as scenarios in which a packet needs to be transmitted through a GRE tunnel in a data center network, a campus network, and various other networks. This helps improve packet transmission efficiency. The following briefly describes the GRE tunnel and other tunnels and related content in this application.

Generic routing encapsulation (GRE) is a protocol used to encapsulate a data packet that uses a routing protocol, to obtain a data packet that uses another routing protocol. In this way, an encapsulated data packet can be transmitted by using the another routing protocol. GRE is a method of establishing a direct point-to-point connection over a network, to simplify a connection between separate networks. GRE encapsulation applies to various network layer protocols.

A control and provisioning of wireless access points (CAPWAP) protocol is a universal tunneling protocol, which is used to implement a basic protocol function for transmitting a packet between an AP and an AC.

An 802.11 protocol is a universal wireless network protocol and a universal standard of a current wireless local area network. The 802.11 protocol is usually used for wireless communication between a terminal and the AP. Wireless network protocols further include another type of protocol. This is not limited in embodiments of this application.

To make objectives, technical solutions, and advantages of this application clearer, the following further describes implementations of this application in detail with reference to the accompanying drawings.

Figure 1:
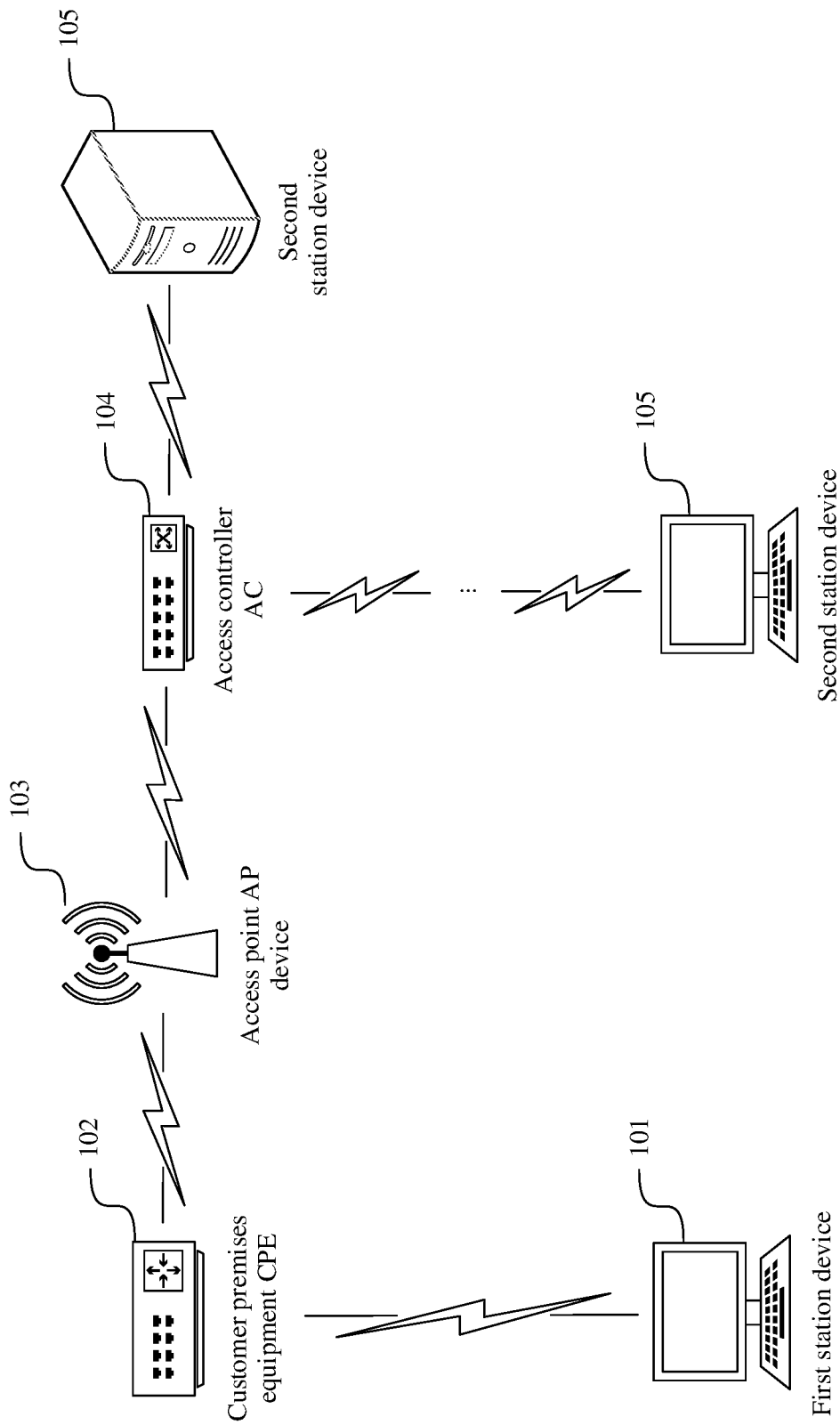
FIG. 1 is an example schematic diagram of an implementation environment of a packet processing method according to an embodiment of this application.

FIG. 1 is a schematic diagram of an implementation environment of a packet processing method according to an embodiment of this application. Refer to FIG. 1. The implementation environment includes a first station device 101, a customer premises equipment 102, an access point device 103, an access controller 104, and a second station device 105.

The first station device 101 is a device of a terminal type. For example, the first station device 101 is user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Optionally, the access terminal is, for example, a cellular phone, a cordless phone, a session initiation protocol (SIP) phone, a wireless local loop (WLL) station, a personal digital assistant (PDA), a handheld device with a wireless communication function, a computing device or another processing device that is connected to a wireless modem, an in-vehicle device, a wearable device, a terminal device in a future 5G network, or a terminal device in a future evolved public land mobile network (PLMN). This is not limited in embodiments of this application. The first station device 101 communicates with the customer premises equipment 102 in a wired or wireless communication manner. A specific manner is not limited in this embodiment of this application. The first station device 101 generates a first original packet, and then sends the generated first original packet to the customer premises equipment 102, so that the customer premises equipment 102 performs packet transmission.

By way of example rather than limitation, in another possible implementation of this embodiment of this application, the first station device 101 is a wearable device. The wearable device may also be referred to as a wearable intelligent device, and is a general term for wearable devices that are intelligently designed and developed for daily wear by using a wearable technology, for example, glasses, gloves, watches, clothes, and shoes. The wearable device is a portable device that is worn directly on the body or integrated onto clothes or an accessory of a user. The wearable device is not only a hardware device, but also can implement powerful functions through software support, data interaction, and cloud interaction. In a broad sense, wearable intelligent devices include full-featured and large-sized devices that can implement all or some functions without relying on smartphones, for example, smart watches or smart glasses, and include devices that focus only on a specific type of application function and need to be used together with other devices (such as smartphones), for example, various smart bands or smart jewelry for monitoring physical signs.

Optionally, the customer premises equipment 102 is a CPE that is based on wireless fidelity (Wi-Fi), a CPE that is based on a fourth-generation (4G) mobile communication technology, a CPE that is based on a fifth-generation (5G) mobile communication technology, or the like. This is not limited in this embodiment of this application. The customer premises equipment 102 communicates with the first station device 101 in a wired or wireless communication manner. A specific manner is not limited in this embodiment of this application. The customer premises equipment 102 further communicates with the access point device 103 in a wireless communication manner. Optionally, there are one or more customer premises equipment 102. A quantity of customer premises equipment 102 is not limited in this embodiment of this application.

The access point device 103 is a home wireless AP, a smart wireless AP, a portable wireless AP, a wireless AP that uses a third-generation (3G) mobile communication technology, a 4G wireless AP, a 5G wireless AP, an enterprise wireless AP, or the like. This is not limited in this embodiment of this application. The access point device 103 communicates with the customer premises equipment 102 in a wireless communication manner, and communicates with the access controller 104 in a wired communication manner. Optionally, there are one or more access point devices 103, and a quantity of access point devices 103 is not limited in this embodiment of this application.

Optionally, the access controller 104 is a wired AC, a wireless AC, or the like. This is not limited in this embodiment of this application. The access controller 104 communicates with the access point device 103 in a wired or wireless communication manner, and the access controller 104 further communicates with the second station device 105 in a wired or wireless communication manner. A specific manner is not limited in this embodiment of this application. Optionally, there are one or more access controllers 104, and a quantity of access controllers 104 is not limited in this embodiment of this application.

The second station device 105 is a device of a server type. For example, the second station device 105 is a server, a plurality of servers, a server cluster, a distributed file system, or a virtualization center. Alternatively, the second station device 105 is a device of a terminal type. For example, the second station device is user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, a wearable device, or the like. This is not limited in this embodiment of this application. If the second station device 105 is the device of the terminal type, for a specific description of a device type of the second station device 105, refer to the foregoing specific description of a device type of the first station device 101. The second station device 105 communicates with the access controller 104 in a wired communication manner. This is not limited in this embodiment of this application.

It should be noted that in this embodiment of this application, only the first station device 101 and the second station device 105 are used as examples for description, and this does not constitute a limitation on quantities of first station devices 101 and second station devices 105. In more possible implementations, there are more first station devices 101 and more second station devices 105, or fewer first station devices 101 and fewer second station devices 105. The quantities of first station devices 101 and second station devices 105 and device types of the first station device 101 and the second station device 105 are not limited in this embodiment of this application. Optionally, the first station device 101 and the second station device 105 each further include another functional device, to provide more comprehensive and diversified services. This is not limited in this embodiment of this application.

The foregoing content describes merely a device type of each device and a manner of connection between devices in the implementation environment. The following describes an interaction process between the devices.

(1) Forward flow: first station device 101→customer premises equipment 102→access point device 103→access controller 104→second station device 105

The first station device 101 generates the first original packet, and then sends the generated first original packet to the customer premises equipment 102. The customer premises equipment 102 receives the first original packet sent by the first station device 101, processes the first original packet to obtain a processed packet, and then sends the processed packet to the access point device 103. The access point device 103 receives the packet sent by the customer premises equipment 102; processes the packet received from the customer premises equipment 102, to obtain a processed packet; and then sends the processed packet to the access controller 104. The access controller 104 receives the packet sent by the access point device 103; processes the packet received from the access point device 103, to obtain the first original packet; and then sends the first original packet to the second station device 105. The second station device 105 receives the first original packet sent by the access controller 104. Therefore, transparent packet transmission is implemented.

(2) Backward flow: second station device 105→access controller 104→access point device 103→customer premises equipment 102→first station device 101

The second station device 105 generates a second original packet, and then sends the generated second original packet to the access controller 104. The access controller 104 receives the second original packet sent by the second station device 105; processes the second original packet received from the second station device 105, to obtain a processed packet; and then sends the processed packet to the access point device 103. The access point device 103 receives the packet sent by the access controller 104; processes the packet received from the access controller 104, to obtain a processed packet; and then sends the processed packet to the customer premises equipment 102. The customer premises equipment 102 receives the packet sent by the access point device 103; processes the packet received from the access point device 103, to obtain the second original packet; and then sends the second original packet to the first station device 101. The first station device 101 receives the second original packet sent by the customer premises equipment 102. Therefore, transparent packet transmission is implemented.

Optionally, if the second station device 105 is the device of the terminal type, in more possible implementations, the second station device 105 receives and sends data through a corresponding CPE and AP. A connection and an interaction manner between the second station device 105 and each device are similar to those described in the foregoing content.

Figure 2A:
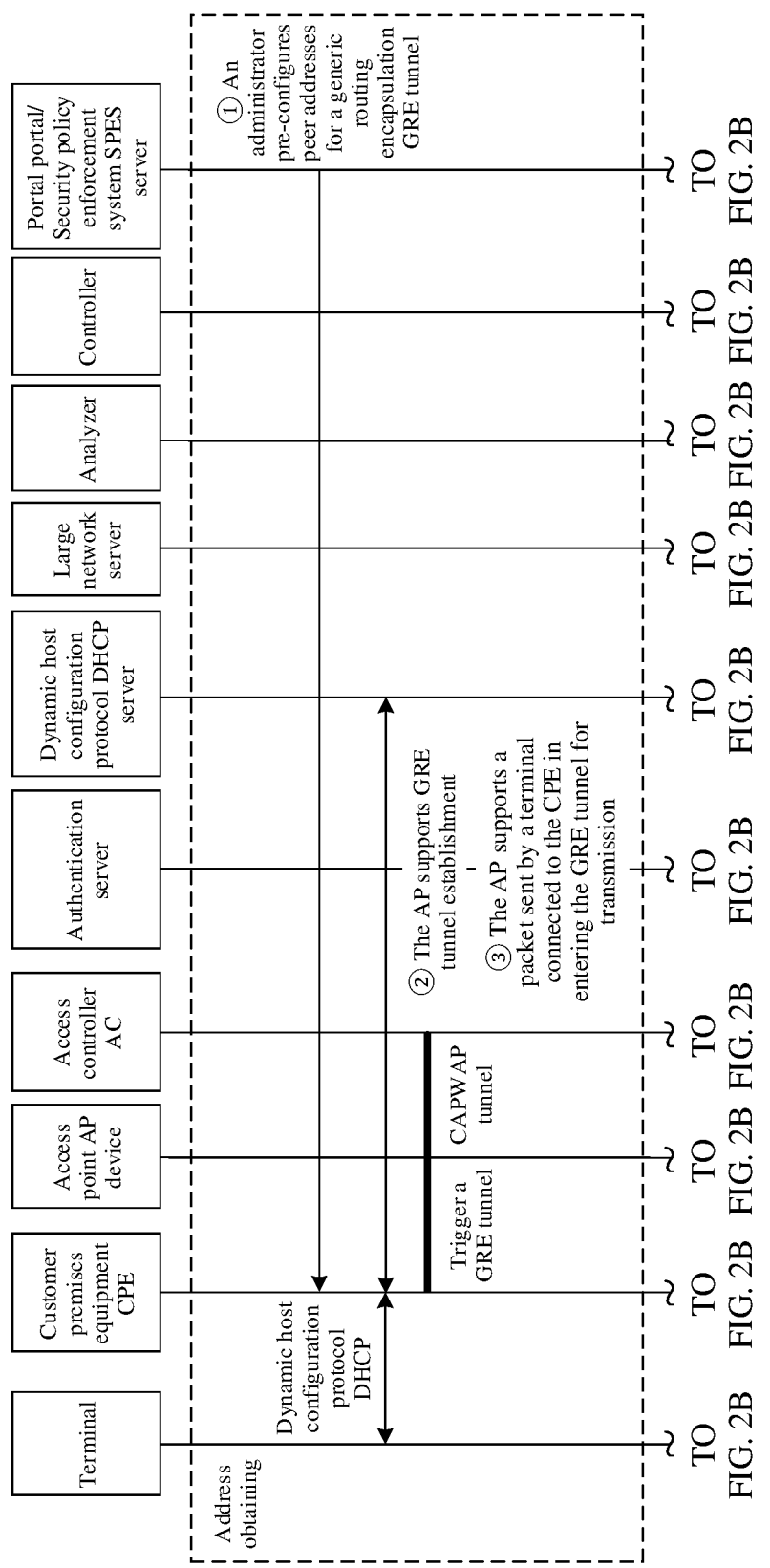
FIG. 2A, FIG. 2B, and FIG. 2C are example schematic diagrams of a preparation procedure of a packet processing method according to an embodiment of this application.
Figure 2B:
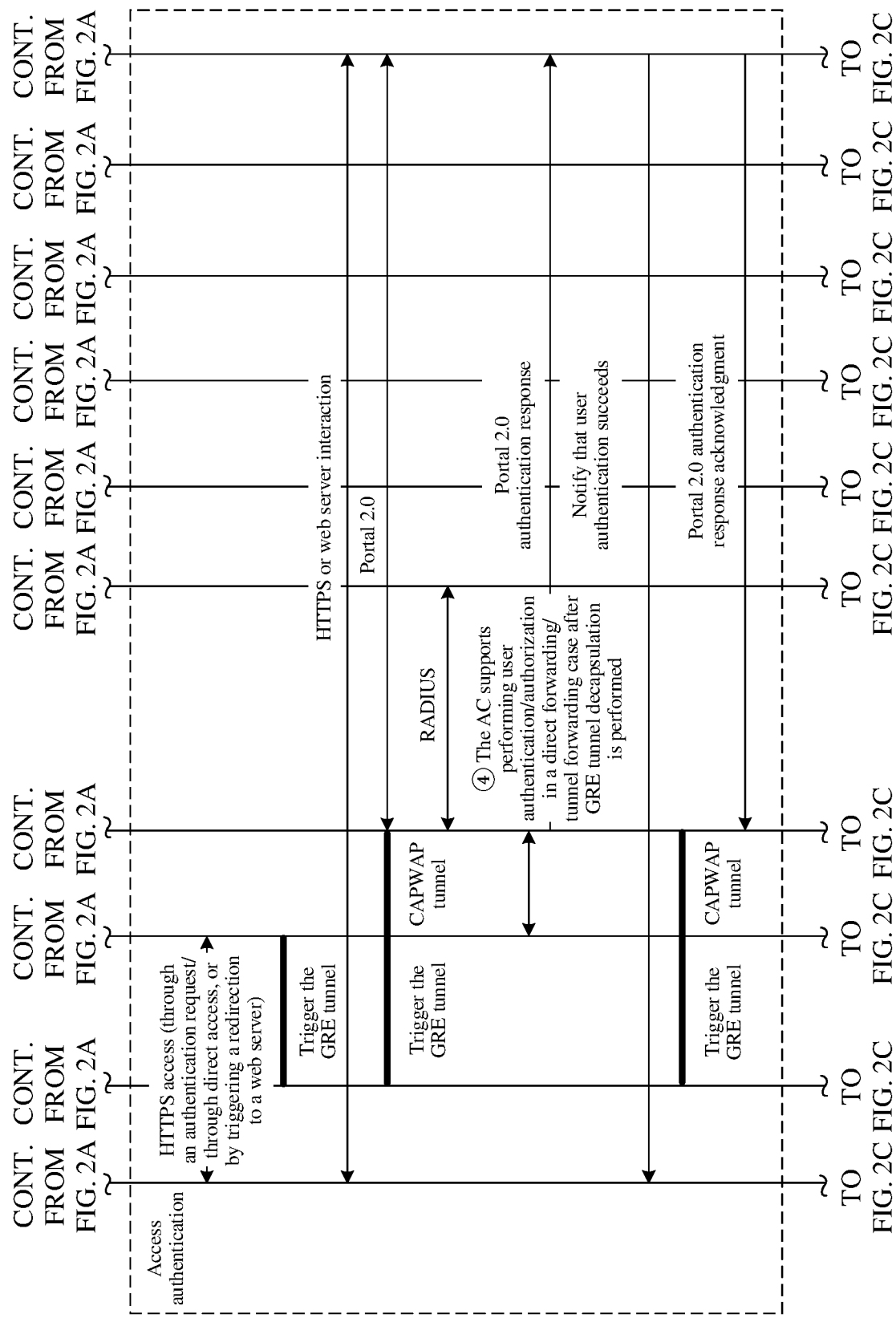
Figure 2C:
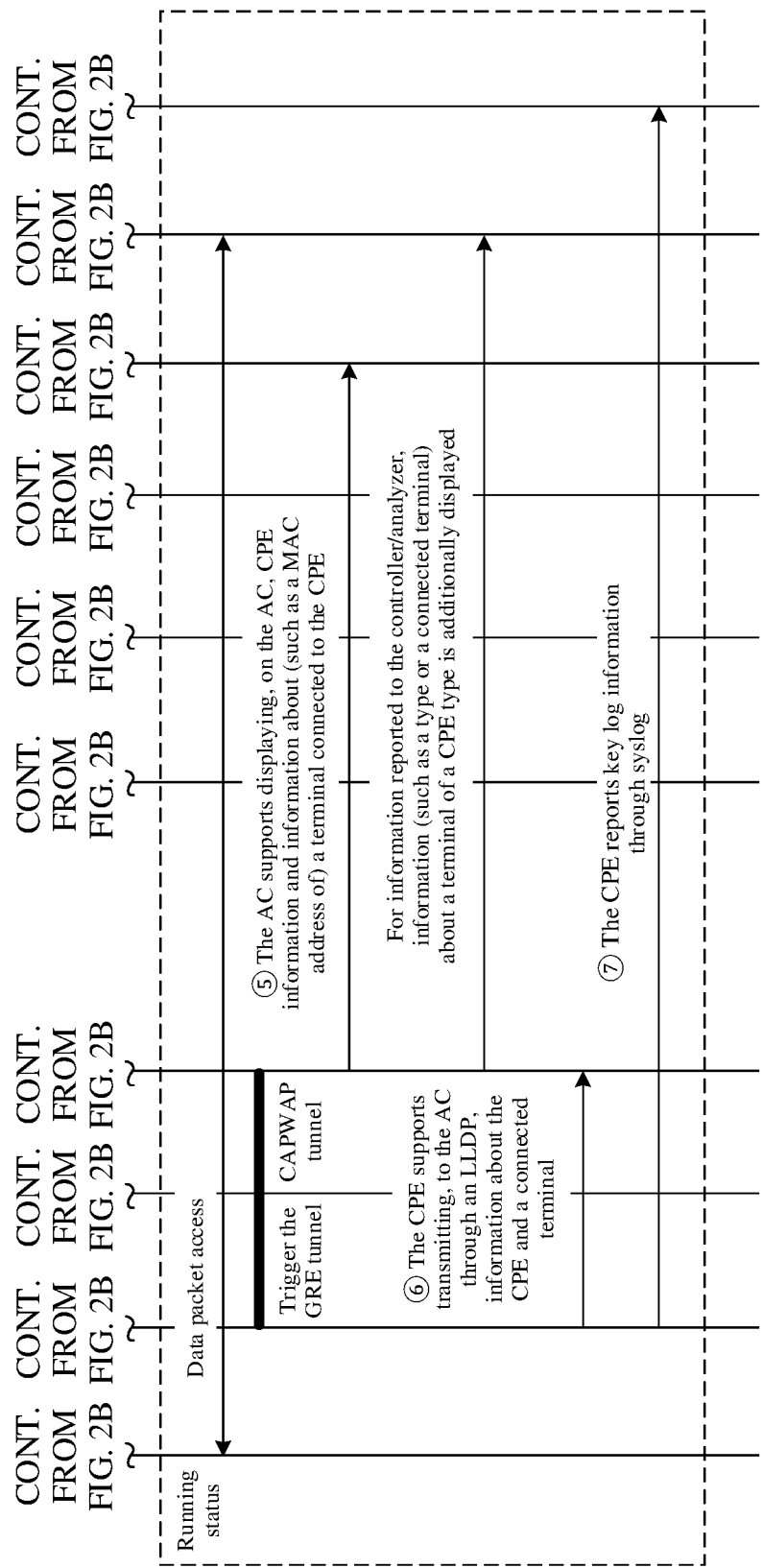

It should be noted that, before a packet is processed by using the solution provided in this embodiment of this application, some preparation work needs to be performed in advance, for example, network access authentication is performed on a terminal connected to a CPE, that is, a first station device. For example, the terminal, the CPE, and an AP are located in a same local area network. In this case, a GRE tunnel between the CPE and the AP is an Ethernet over GRE (EoGRE) tunnel. The EoGRE tunnel performs GRE encapsulation on an Ethernet protocol-based packet, so that a packet obtained through encapsulation can be transmitted in a network that uses another network layer protocol. Refer to FIG. 2A, FIG. 2B, and FIG. 2C. FIG. 2A, FIG. 2B, and FIG. 2C are a schematic diagram of a preparation procedure of a packet processing method according to an embodiment of this application. A preparation procedure of a process in which a station device (such as a terminal) connected to the CPE performs network access authentication is used as an example. The preparation procedure is mainly divided into three parts: an address obtaining process, an access authentication process, and a terminal running process. The following separately describes the three parts.

In the address obtaining process, a related person skilled in the art (such as an administrator) pre-configures peer addresses (that is, IP addresses of devices located at two ends of a GRE tunnel) for the GRE tunnel on a dynamic host configuration protocol (DHCP) server. In this way, when receiving information about an address obtaining request from the terminal, the CPE obtains an address based on an IP address and configuration information that are dynamically allocated to the terminal through the DHCP server. When the DHCP server dynamically allocates an IP address and configuration information to the terminal, the AC, the AP, and the CPE are involved. When the AC, the AP, and the CPE communicate with each other, data packet transmission is performed by triggering a GRE tunnel between the CPE and the AP and a CAPWAP tunnel between the AP and the AC. It should be noted that the AP supports GRE tunnel establishment and a function of supporting a packet sent by the terminal connected to the CPE in entering the GRE tunnel for transmission. Therefore, the GRE tunnel is established between the CPE and the AP, and a packet is transmitted through the GRE tunnel between the CPE and the AC.

In the access authentication process, the terminal sends a hypertext transfer protocol secure (HTTPS) request to the AP for network authentication. The HTTPS request includes a data packet. In a process of transmitting a data packet between the terminal and the AP, the data packet needs to pass through the CPE. To be specific, the process of transmitting a data packet between the terminal and the AP includes a process of transmitting the data packet between the terminal and the CPE and a process of transmitting the data packet between the CPE and the AP. In the process of transmitting the data packet between the CPE and the AP, the GRE tunnel is triggered, and then the data packet is transmitted through the GRE tunnel. Optionally, the HTTPS request is an authentication request, an access request, or a redirection request used to trigger a redirection to a world wide web (WEB) server. This is not limited in this embodiment of this application. After the terminal sends the HTTPS request to the AP, the terminal interacts with an HTTPS server or a web server for network authentication. For example, the HTTPS server is a portal server, and the web server is a security policy enforcement system (SPES) server. Interaction between the terminal and the portal server/SPES server involves the CPE, the AP, and the AC. In an interaction process between the CPE and the AP, the GRE tunnel is triggered, and then interaction is performed through the GRE tunnel. In an interaction process between the AP and the AC, the CAPWAP tunnel is triggered, and then interaction is performed through the CAPWAP tunnel. Interaction between the AC and the portal server/SPES server is performed based on a portal 2.0 protocol standard. In addition, in a process in which the portal server/SPES server performs access authentication on the terminal, remote authentication dial-in user service (RADIUS) authentication needs to be further performed between the AC and an authentication server. After the RADIUS authentication succeeds, the AC sends a portal 2.0 authentication response to the portal server/SPES server. After receiving the portal 2.0 authentication response, the portal server/SPES server sends a notification message to the terminal to notify that user authentication succeeds, and sends a portal 2.0 authentication response acknowledgment to the AC. It should be noted that the AC supports performing user authentication/authorization in a direct forwarding/tunnel forwarding case after GRE tunnel decapsulation is performed. In other words, the AC can perform access authentication on the terminal based on a packet that is obtained through decapsulation performed through the GRE tunnel.

In the terminal running process, the terminal and a controller interact with each other by using a data packet. In an interaction process between the terminal and the controller, the CPE, the AP, and the AC are involved. In an interaction process between the CPE and the AP, the GRE tunnel is triggered, and then interaction is performed through the GRE tunnel. In an interaction process between the AP and the AC, the CAPWAP tunnel is triggered, and then interaction is performed through the CAPWAP tunnel. The AC supports displaying, on the AC, CPE information and information about (such as a MAC address of) a terminal connected to the CPE. For information reported by the AC to the controller/analyzer, information (such as a type or a connected terminal) about a terminal of a CPE type is additionally displayed. The CPE supports transmitting, to the AC through a link layer discovery protocol (LLDP), information about the CPE and a terminal connected to the CPE. In addition, the CPE supports reporting key log information to the portal server/SPES server through an industrial standard protocol (syslog).

Figure 3A:
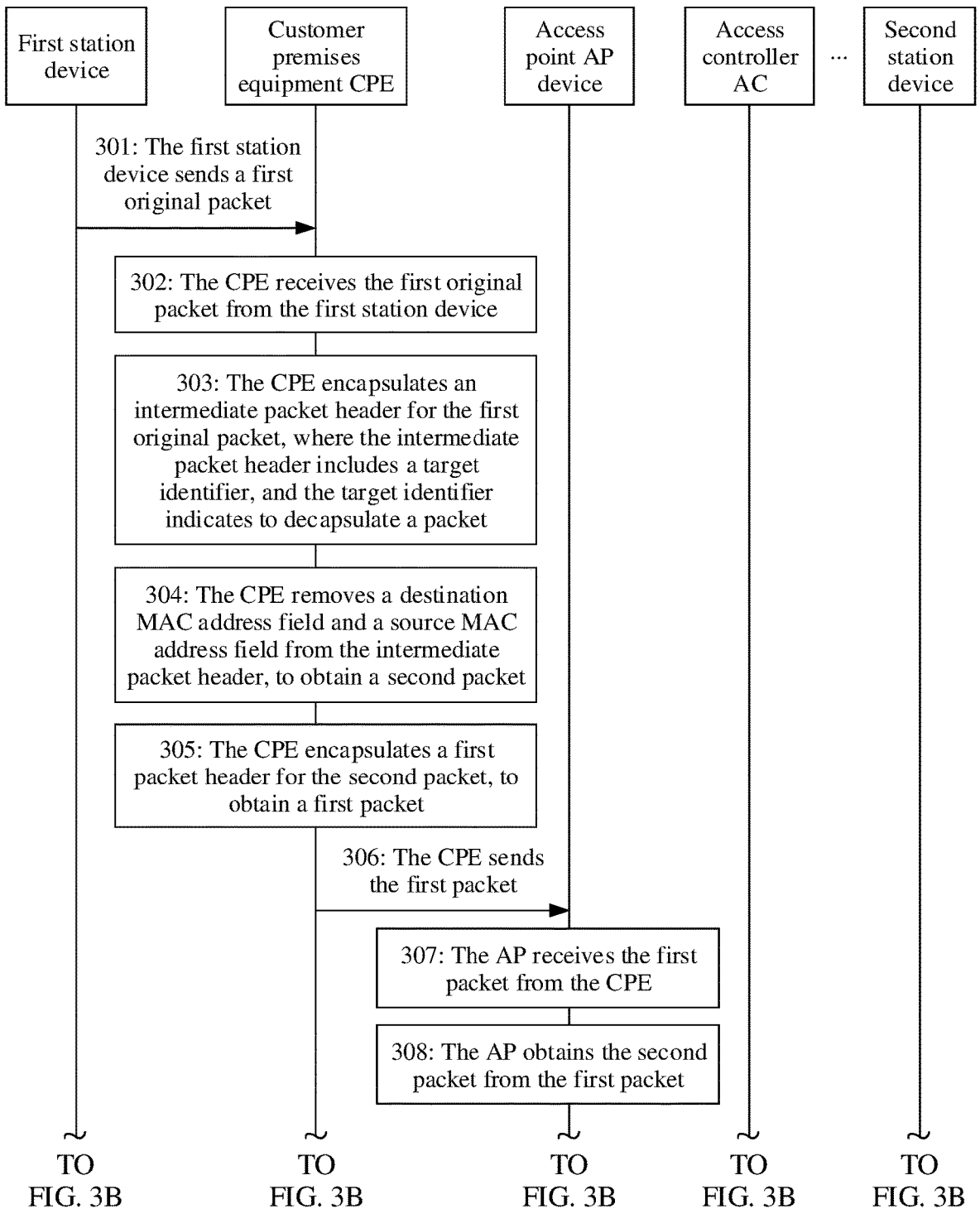
FIG. 3A and FIG. 3B are example schematic flowcharts of a packet processing method according to an embodiment of this application.
Figure 3B:
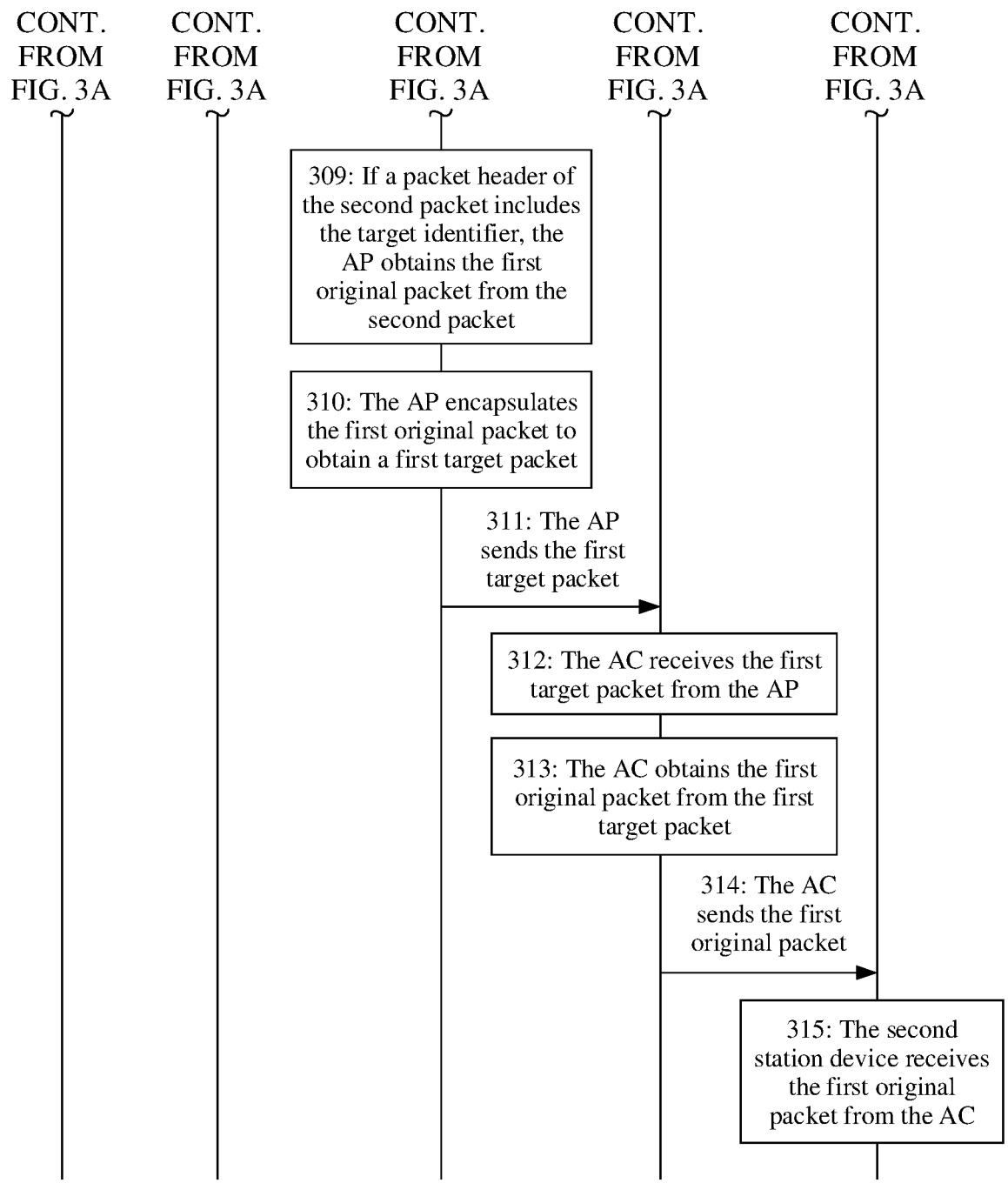

The foregoing procedure is merely a basic procedure of a packet processing method. The following describes a specific procedure of the packet processing method. FIG. 3A and FIG. 3B are a flowchart of a packet processing method according to an embodiment of this application. A forward flow of "first station device→CPE→AP→AC→second station device" is used as an example. A GRE tunnel is established between the CPE and the AP, and a CAPWAP tunnel is established between the AP and the AC. Refer to FIG. 3A and FIG. 3B. The method procedure includes the following steps.

301: The first station device sends a first original packet.

Optionally, the first original packet may have a plurality of types, such as an authentication packet, an address resolution protocol (ARP) packet, or the like. Alternatively, the first original packet is a packet of another type. This is not limited in this embodiment of this application.

In a possible implementation, the first original packet is a data packet. The first original packet includes a destination media access control (MAC) address field, a source MAC address field, a protocol type field, a destination internet protocol (IP) address field, a source IP address field, and a data field. Optionally, a packet format of the first original packet is of another type. This is not limited in this embodiment of this application.

Figure 4:
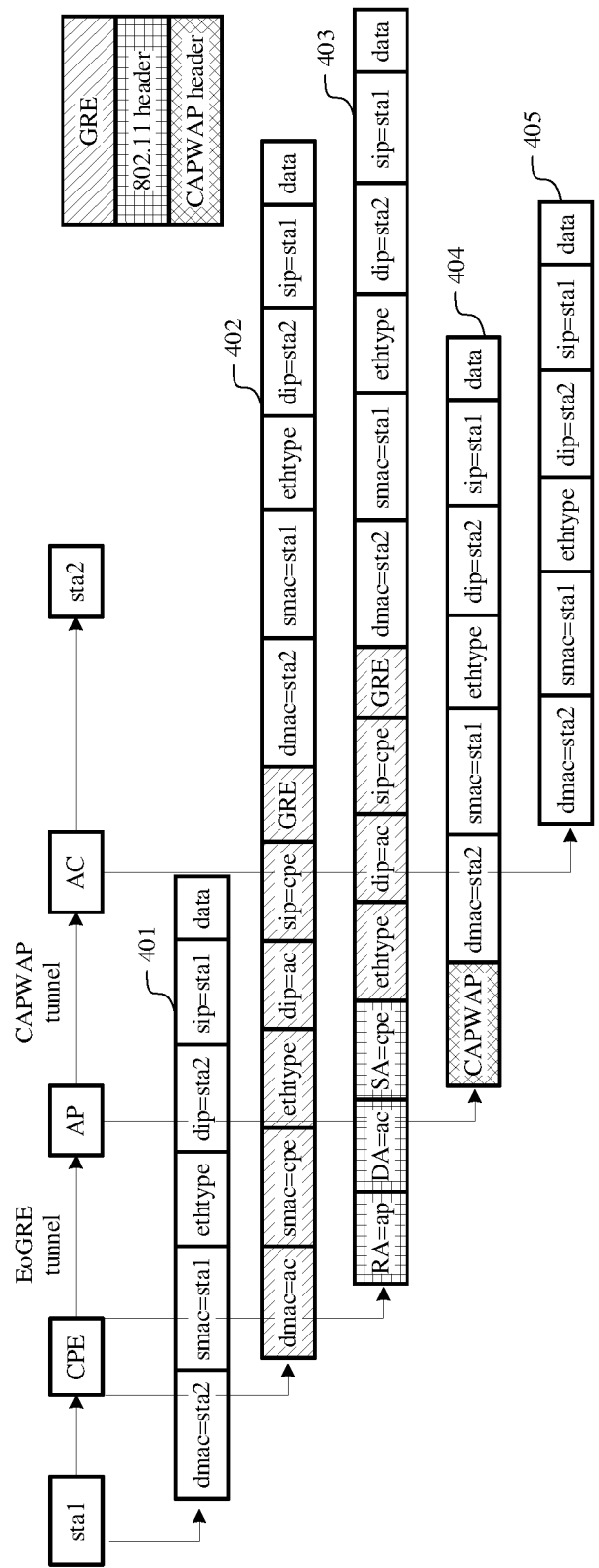
FIG. 4 is an example schematic diagram of packet formats in a packet processing process according to an embodiment of this application.

For information carried in each field of the first original packet in a transmission procedure of "first station device-→CPE→AP→AC→second station device", refer to FIG. 4. FIG. 4 is a schematic diagram of packet formats in a packet processing process according to an embodiment of this application. In the packets shown in FIG. 4, a packet 401 is the first original packet. Refer to the packet 401 shown in FIG. 4. Information (that is, a destination MAC address) carried in the destination MAC address field of the first original packet indicates a MAC address of the second station device (a sta2). Information (that is, a source MAC address) carried in the source MAC address field of the first original packet indicates a MAC address of the first station device (a sta1). Information (that is, a destination IP address) carried in the destination IP address field of the first original packet indicates an IP address of the sta2. Information (that is, a source IP address) carried in the source IP address field of the first original packet indicates an IP address of the sta1.

302: The CPE receives the first original packet from the first station device.

303: The CPE encapsulates an intermediate packet header for the first original packet, where the intermediate packet header includes a target identifier, and the target identifier indicates to decapsulate the packet.

For ease of description, a packet obtained by encapsulating the intermediate packet header for the first original packet is recorded as a packet A. In a possible implementation, after receiving the first original packet from the first station device, the CPE encapsulates the intermediate packet header for the first original packet. Then, the packet A is obtained. A packet header of the packet A is the intermediate packet header, and a destination address field in the intermediate packet header is set to carry the target identifier. To be specific, the destination address field in a to-be-encapsulated intermediate packet header is set to carry the target identifier, and then the intermediate packet header whose destination address field is set to be the target identifier is encapsulated and placed before a first field of the first original packet. In this way, encapsulation of the first original packet is implemented.

Optionally, the destination address field is a destination IP address field, or the destination address field is a destination MAC address field. This is not limited in this embodiment of this application. Optionally, the target identifier is a specified IP address or a specified MAC address, or the target identifier is another type of specified identifier. This is not limited in this embodiment of this application. For example, the target identifier is a specified IP address 0.0.0.0.

When the first original packet is encapsulated, a GRE protocol is used to encapsulate the first original packet. In this case, the intermediate packet header is a GRE header. Correspondingly, encapsulating the intermediate packet header for the first original packet is encapsulating the GRE header for the first original packet. Therefore, a packet obtained by encapsulating the intermediate packet header for the first original packet is a GRE packet.

In a possible implementation, the intermediate packet header includes a MAC address field, a source MAC address field, a protocol type field, a destination IP address field, a source IP address field, and a packet header type field. Optionally, a format of the intermediate packet header is of another type. This is not limited in this embodiment of this application.

The schematic diagram of packet formats shown in FIG. 4 is still used as an example for description. In the packets shown in FIG. 4, a packet 402, namely, the packet A, is the packet obtained by encapsulating the intermediate packet header for the first original packet. Refer to the packet 402 shown in FIG. 4. The packet A is obtained by encapsulating the first original packet, and a packet body of the packet A is the first original packet. In the packet header (that is, the intermediate packet header) of the packet A, information (that is, a destination MAC address) carried in the destination MAC address field indicates a MAC address of the AC. Information (that is, a source MAC address) carried in the source MAC address field indicates a MAC address of the CPE. Information (that is, a destination IP address) carried in the destination IP address field indicates an IP address of the AC. Information (that is, a source IP address) carried in the source IP address field indicates an IP address of the CPE. Information carried in the packet header type field indicates that the intermediate packet header is the GRE header.

304: The CPE removes the destination MAC address field and the source MAC address field from the intermediate packet header, to obtain a second packet.

It should be noted that removing the destination MAC address field and the source MAC address field from the intermediate packet header is removing the destination MAC address field and the source MAC address field from the packet header of the packet A.

A packet header of the second packet includes the protocol type field, the destination IP address field, the source IP address field, and the packet header type field. Optionally, a format of the packet header of the second packet is of another type. This is not limited in this embodiment of this application.

305: The CPE encapsulates a first packet header for the second packet, to obtain a first packet.

A wireless network protocol is used when the second packet is encapsulated to obtain the first packet. Optionally, the wireless network protocol is an 802.11 protocol, or the wireless network protocol is another protocol. This is not limited in this embodiment of this application.

For example, the wireless network protocol is the 802.11 protocol. In this case, the first packet is an 802.11 packet, and the first packet header is an 802.11 header. Correspondingly, a packet encapsulation process is as follows: When the first packet header is encapsulated for the second packet, the 802.11 header is encapsulated for the second packet, to obtain the 802.11 packet, and the 802.11 packet is used as the first packet.

In a possible implementation, the first packet header includes a receiver address field, a destination address field, and a source address field. Optionally, a format of the first packet header is of another type. This is not limited in this embodiment of this application.

The schematic diagram of packet formats shown in FIG. 4 is still used as an example for description. In a packet processing process shown in FIG. 4, the wireless network protocol is the 802.11 protocol. In the packets shown in FIG. 4, a packet 403 is the first packet. Refer to the packet 403 shown in FIG. 4. The first packet is obtained through encapsulation performed based on the packet A, namely, the packet 402. In contrast to the packet A, the first packet is obtained by encapsulating the 802.11 header before a first field of the second packet, where the second packet is a packet obtained by removing the destination MAC address field and the source MAC address field from the GRE header of the packet A. The 802.11 header includes the receiver address field, the destination address field, and the source address field. Information (that is, a receiver address) carried in the receiver address field indicates a MAC address of the AP. Information (that is, a destination address) carried in the destination address field indicates the MAC address of the AC. Information (that is, a source address) carried in the source address field indicates the MAC address of the CPE.

306: The CPE sends the first packet.

In a possible implementation, the CPE sends the first packet to the AP.

307: The AP receives the first packet from the CPE.

308: The AP obtains the second packet from the first packet.

In a possible implementation, after receiving the first packet sent by the CPE, the AP removes the first packet header of the first packet to obtain the second packet. The second packet is the packet obtained by removing the destination MAC address field and the source MAC address field from the packet A.

Removing the first packet header of the first packet is removing the receiver address field, the destination address field, and the source address field from the first packet.

In a possible implementation, a process of removing the first packet header of the first packet includes: The AP parses the first packet to determine fields (that is, the receiver address field, the destination address field, and the source address field) corresponding to the first packet header of the first packet, and then removes the fields corresponding to the first packet header of the first packet, to remove the first packet header of the first packet.

It should be noted that, when the packet A is encapsulated to obtain the first packet, the destination MAC address field and the source MAC address field in the packet header (that is, the intermediate packet header) of the packet A are first removed, and then a packet header is encapsulated. Therefore, if the first packet header is removed from the first packet, a packet header of an obtained packet is not the intermediate packet header, but a packet header obtained by removing the destination MAC address field and the source MAC address field from the intermediate packet header. In other words, the obtained packet is not a complete packet A, but a packet obtained by removing the destination MAC address field and the source MAC address field from the packet A. For ease of description, in this embodiment of this application, only the packet obtained by removing the destination MAC address field and the source MAC address field from the packet A is recorded as the second packet. In an actual implementation process, the second packet does not exist. The second packet is merely an intermediate product generated in a process in which the AP processes a packet, and there is no second packet in actual packet transmission.

309: If the packet header of the second packet includes the target identifier, the AP obtains the first original packet from the second packet.

It should be noted that, the target identifier indicates to decapsulate a packet, and therefore the target identifier included in the packet header of the second packet can indicate the AP to decapsulate the second packet.

In a possible implementation, if the packet header of the second packet includes the target identifier, the AP removes the packet header of the second packet to obtain the first original packet.

Removing the packet header of the second packet is removing the protocol type field, the destination IP address field, the source IP address field, and the packet header type field from the second packet.

In a possible implementation, a process of removing the packet header of the second packet includes: The AP parses the second packet to determine fields (that is, the protocol type field, the destination IP address field, the source IP address field, and the packet header type field) corresponding to the packet header of the second packet, and then removes the fields corresponding to the packet header of the second packet, to remove the packet header of the second packet.

310: The AP encapsulates the first original packet to obtain a first target packet.

In a possible implementation, the AP encapsulates a packet header for the first original packet to obtain the first target packet.

When the first original packet is encapsulated, a CAPWAP protocol is used to encapsulate the first original packet, to obtain the first target packet. Correspondingly, the first target packet is a CAPWAP packet. To be specific, when the packet header is encapsulated for the first original packet, a CAPWAP header is encapsulated for the first original packet, to obtain the CAPWAP packet, and the CAPWAP packet is used as the first target packet.

In a possible implementation, a packet header of the first target packet that is obtained through encapsulation includes a packet header type field. Optionally, a format of the packet header of the first target packet is of another type. This is not limited in this embodiment of this application.

The schematic diagram of packet formats shown in FIG. 4 is still used as an example for description. In the packets shown in FIG. 4, a packet 404 is the first target packet. Refer to the packet 404 shown in FIG. 4. The first target packet is obtained by encapsulating the first original packet, and a packet body of the first target packet is the first original packet. In the packet header of the first target packet, information carried in the packet header type field indicates that the packet header of the first target packet is the CAPWAP header.

311: The AP sends the first target packet.

In a possible implementation, the AP sends the first target packet to the AC.

312: The AC receives the first target packet from the AP.

313: The AC obtains the first original packet from the first target packet.

In a possible implementation, after receiving the first target packet sent by the AP, the AC removes the packet header of the first target packet to obtain the first original packet.

Removing the packet header of the first target packet is removing the packet header type field from the first target packet.

In a possible implementation, a process of removing the packet header of the first target packet includes: The AC parses the first target packet to determine a field (that is, the packet header type field) corresponding to the packet header of the first target packet, and then removes the field corresponding to the packet header of the first target packet, to remove the packet header of the first target packet.

The schematic diagram of packet formats shown in FIG. 4 is still used as an example for description. In the packets shown in FIG. 4, a packet 405 is the first original packet that is obtained from the first target packet by the AC. The packet 405 and the packet 401 are a same packet. For a specific format of the packet 405, refer to Step 301.

314: The AC sends the first original packet.

In a possible implementation, the AC sends the first original packet to the second station device.

315: The second station device receives the first original packet from the AC.

In the solution provided in this embodiment of this application, the CPE sets, in the packet header of the second packet, the target identifier that indicates to decapsulate a packet. Then, the CPE sends, to the AP, the first packet obtained by encapsulating the second packet. In this way, when determining that the packet header of the received first packet includes the target identifier, the AP obtains, from the received first packet, the first original packet that is initially sent by the first station device. Then, the AP directly performs one layer of encapsulation on the first original packet, to obtain the first target packet used for sending. In this case, there is no need to perform a plurality of layers of encapsulation. Therefore, packet transmission efficiency is improved. Further, the solution in this embodiment of this application provides a new GRE tunnel establishment manner. In this manner, the GRE tunnel is established between the CPE and the AP, and the CAPWAP tunnel is established between the AP and the AC. In addition, the AP is provided with a function of decapsulating, upon reception of a packet whose destination address field carries the target identifier, the packet. In this case, only one layer of CAPWAP-tunnel encapsulation is needed for packet transmission between the AP and the AC. Therefore, transmission efficiency of an entire network is improved, and a capability of the GRE tunnel in an entire system is improved. Moreover, in a conventional technology, establishment of the GRE tunnel needs to consume a tunnel table of the AC. The CPE is a terminal device, and there is usually a large quantity of CPEs. Therefore, overheads of tunnel tables in the AC are very high. Consequently, the CPE cannot be deployed in many scenarios. In contrast, in the solution provided in this embodiment of this application, the GRE tunnel is established only between the CPE and the AP, and no tunnel table of the AC is consumed. Therefore, the GRE tunnel can be deployed in more scenarios. This simplifies GRE deployment corresponding to the CPE, and reduces capital expenditure (CAPEX) costs of an enterprise.

Figure 5A:
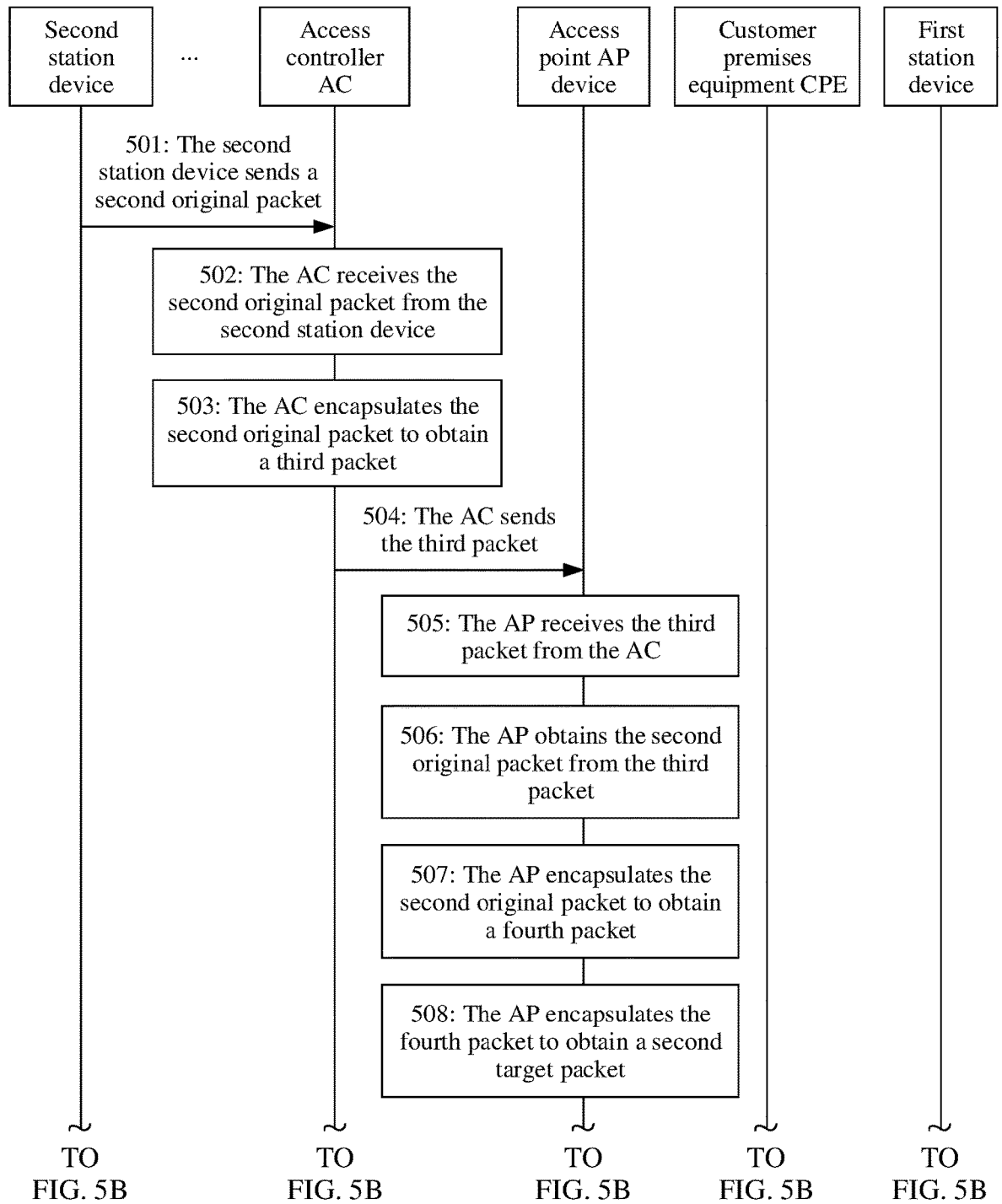
FIG. 5A and FIG. 5B are example schematic flowcharts of a packet processing method according to an embodiment of this application.
Figure 5B:
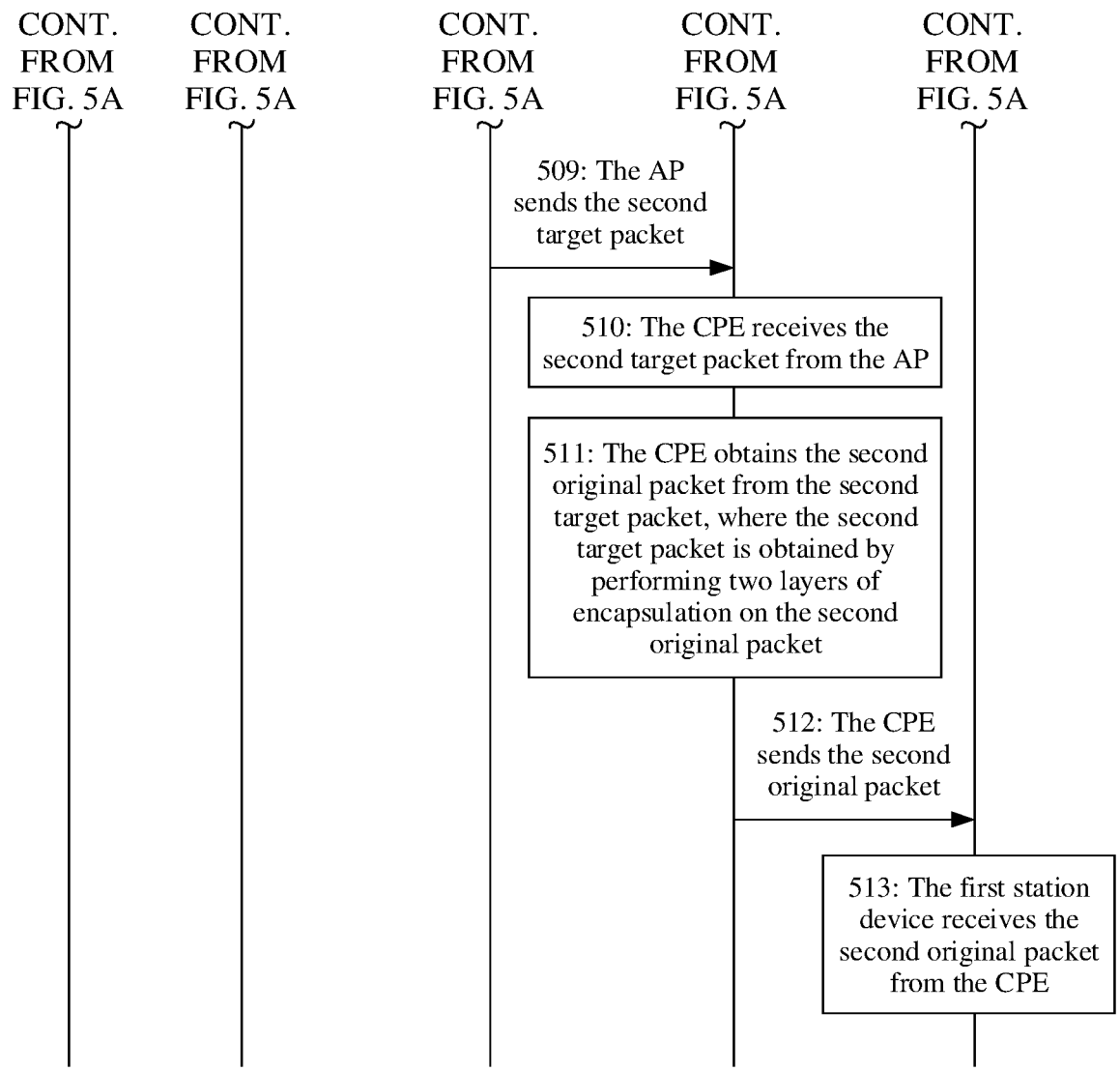

The process shown in FIG. 3A and FIG. 3B is merely a processing process corresponding to a flow of "first station device→CPE→AP→AC→second station device". The following describes a backward flow corresponding to FIG. 3A and FIG. 3B. FIG. 5A and FIG. 5B are a flowchart of a packet processing method according to an embodiment of this application. The backward flow of "second station device→AC→AP→CPE→first station device" is used as an example. Refer to FIG. 5A and FIG. 5B. A GRE tunnel is established between the CPE and the AP, and a CAPWAP tunnel is established between the AP and the AC. The method procedure includes the following steps.

501: The second station device sends a second original packet.

Optionally, the second original packet may have a plurality of types, such as an authentication packet, an ARP packet, and the like. Alternatively, the second original packet is a packet of another type. This is not limited in this embodiment of this application.

In a possible implementation, the second original packet is a data packet. The second original packet includes a destination MAC address field, a source MAC address field, a protocol type field, a destination IP address field, a source IP address field, and a data field. Optionally, a packet format of the second original packet is of another type. This is not limited in this embodiment of this application.

Figure 6:
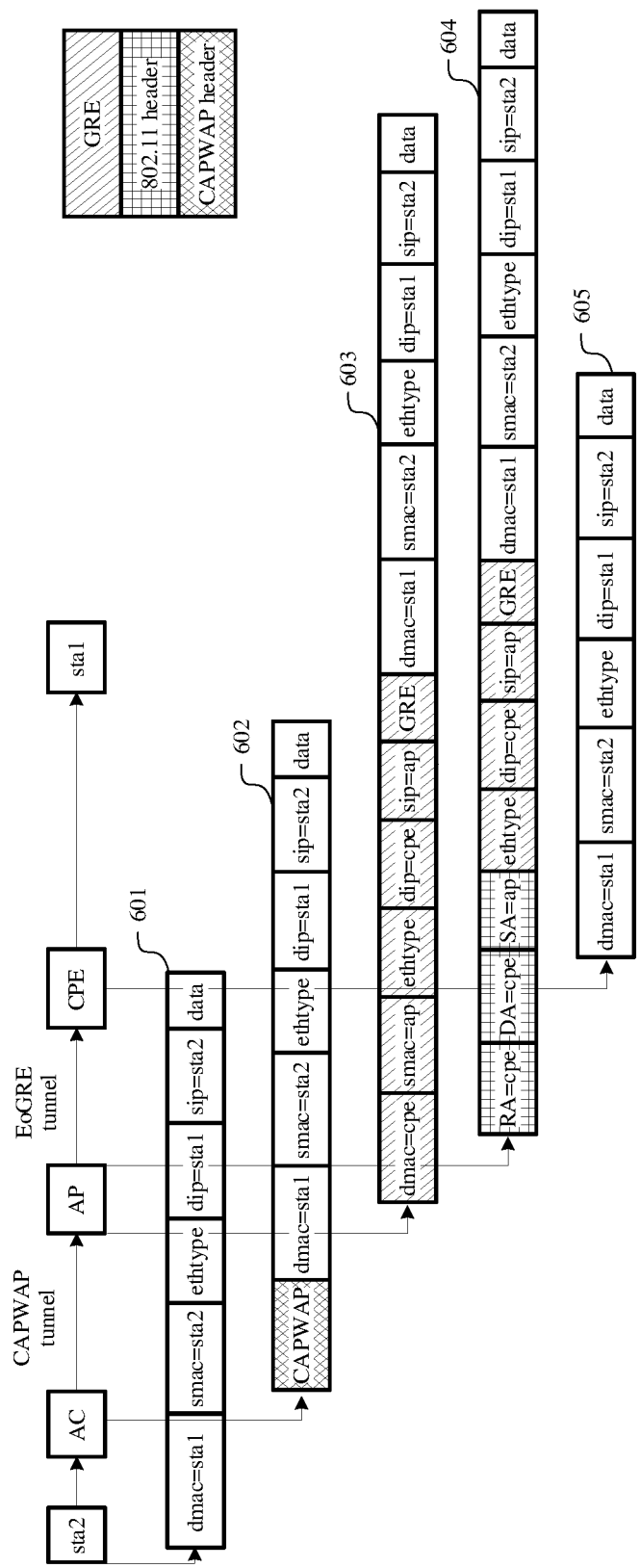
FIG. 6 is an example schematic diagram of packet formats in a packet processing process according to an embodiment of this application.

For information carried in each field of the second original packet in a transmission procedure of "second station device→AC→AP→CPE→first station device", refer to FIG. 6. FIG. 6 is a schematic diagram of packet formats in a packet processing process according to an embodiment of this application. In the packets shown in FIG. 6, a packet 601 is the second original packet. Refer to the packet 601 shown in FIG. 6. Information (that is, a destination MAC address) carried in the destination MAC address field of the second original packet indicates a MAC address of the first station device (a sta1). Information (that is, a source MAC address) carried in the source MAC address field of the second original packet indicates a MAC address of the second station device (a sta2). Information (that is, a destination IP address) carried in the destination IP address field of the second original packet indicates an IP address of the sta1. Information (that is, a source IP address) carried in the source IP address field of the second original packet indicates an IP address of the sta2.

502: The AC receives the second original packet from the second station device.

503: The AC encapsulates the second original packet to obtain a third packet.

In a possible implementation, after receiving the second original packet sent by the second station device, the AC encapsulates a packet header for the second original packet to obtain the third packet.

When the second original packet is encapsulated, a CAPWAP protocol is used to encapsulate the second original packet, to obtain the third packet. Correspondingly, the third packet is a CAPWAP packet. To be specific, when the packet header is encapsulated for the second original packet, a CAPWAP header is encapsulated for the second original packet, to obtain the CAPWAP packet, and the CAPWAP packet is used as the third packet.

In a possible implementation, a packet header of the third packet that is obtained through encapsulation includes a packet header type field. Optionally, a format of the packet header of the third packet is of another type. This is not limited in this embodiment of this application.

The schematic diagram of packet formats shown in FIG. 6 is still used as an example for description. In the packets shown in FIG. 6, a packet 602 is the third packet. Refer to the packet 602 shown in FIG. 6. The third packet is obtained by encapsulating the second original packet, and a packet body of the third packet is the second original packet. In the packet header of the third packet, information carried in the packet header type field indicates that the packet header of the third packet is the CAPWAP header.

504: The AC sends the third packet.

In a possible implementation, the AC sends the third packet to the AP.

505: The AP receives the third packet from the AC.

506: The AP obtains the second original packet from the third packet.

In a possible implementation, after receiving the third packet sent by the AP, the AC removes the packet header of the third packet to obtain the second original packet.

Removing the packet header of the third packet is removing the packet header type field from the third packet.

In a possible implementation, a process of removing the packet header of the third packet includes: The AP parses the third packet to determine a field (that is, the packet header type field) corresponding to the packet header of the third packet, and then removes the field corresponding to the packet header of the third packet, to remove the packet header of the third packet.

507: The AP encapsulates the second original packet to obtain a fourth packet.

In a possible implementation, the AP encapsulates a packet header for the second original packet to obtain the fourth packet.

When the second original packet is encapsulated, a GRE protocol is used to encapsulate the second original packet, to obtain the fourth packet. Correspondingly, the fourth packet is a GRE packet. To be specific, when the packet header is encapsulated for the second original packet, a GRE header is encapsulated for the second original packet, to obtain the GRE packet, and the GRE packet is used as the fourth packet.

In a possible implementation, a packet header of the fourth packet that is obtained through encapsulation includes a destination MAC address field, a source MAC address field, a protocol type field, a destination IP address field, a source IP address field, and a packet header type field. Optionally, a format of the packet header of the fourth packet is of another type. This is not limited in this embodiment of this application.

The schematic diagram of packet formats shown in FIG. 6 is still used as an example for description. In the packets shown in FIG. 6, a packet 603 is the fourth packet. Refer to the packet 603 shown in FIG. 6. The fourth packet is obtained by encapsulating the second original packet, and a packet body of the fourth packet is the second original packet. In the packet header of the fourth packet, information (that is, a destination MAC address) carried in the destination MAC address field indicates a MAC address of the CPE. Information (that is, a source MAC address) carried in the source MAC address field indicates a MAC address of the AP. Information (that is, a destination IP address) carried in the destination IP address field indicates an IP address of the CPE. Information (that is, a source IP address) carried in the source IP address field indicates an IP address of the AP. Information carried in the packet header type field indicates that the packet header of the fourth packet is the GRE header.

508: The AP encapsulates the fourth packet to obtain a second target packet.

In a possible implementation, the AC removes the destination MAC address field and the source MAC address field from the packet header of the fourth packet, and encapsulates a packet header for a packet obtained after processing, to obtain the second target packet.

When the fourth packet is encapsulated, a wireless network protocol is used to encapsulate the fourth packet, to obtain the second target packet. Optionally, the wireless network protocol is an 802.11 protocol, or the wireless network protocol is another protocol. This is not limited in this embodiment of this application. For example, the wireless network protocol is the 802.11 protocol. In this case, the second target packet is an 802.11 packet. Correspondingly, a packet encapsulation process is as follows: When a packet header is encapsulated for the fourth packet, the destination MAC address field and the source MAC address field are first removed from the packet header of the fourth packet. In other words, the destination MAC address field and the source MAC address field are first removed from the GRE header of the fourth packet. Then, the 802.11 header is encapsulated for the packet obtained after processing, to obtain the 802.11 packet, and the 802.11 packet is used as the second target packet.

The schematic diagram of packet formats shown in FIG. 6 is still used as an example for description. In a packet processing process shown in FIG. 6, the wireless network protocol is the 802.11 protocol. In the packets shown in FIG. 6, a packet 604 is the second target packet. Refer to the packet 604 shown in FIG. 6. The second target packet is obtained through encapsulation performed based on the fourth packet, namely, the packet 603. In contrast to the fourth packet, the second target packet is obtained by removing the destination MAC address field and the source MAC address field from the GRE header of the fourth packet and then encapsulating the 802.11 header before a first field of the packet obtained through processing. The 802.11 header includes a receiver address field, a destination address field, and a source address field. Information (that is, a receiver address) carried in the receiver address field indicates the MAC address of the CPE. Information (that is, a destination address) carried in the destination address field indicates the MAC address of the CPE. Information (that is, a source address) carried in the source address field indicates the MAC address of the AP.

509: The AP sends the second target packet.

In a possible implementation, the AP sends the second target packet to the CPE.

510: The CPE receives the second target packet from the AP.

511: The CPE obtains the second original packet from the second target packet, where the second target packet is obtained by performing two layers of encapsulation on the second original packet.

The two layers of encapsulation include wireless network protocol encapsulation and GRE protocol encapsulation. Correspondingly, the second target packet includes two types of packet headers. Therefore, when decapsulating the second target packet, the CPE needs to perform two layers of decapsulation on the second target packet, to obtain the second original packet.

In a possible implementation, after receiving the second target packet sent by the AP, the CPE removes a packet header that is in the second target packet and that is encapsulated based on the wireless network protocol, to obtain a packet that is obtained by performing one layer of decapsulation. Then, the CPE removes a packet header that is encapsulated based on the GRE protocol and that is in the packet obtained by performing one layer of decapsulation, to obtain the second original packet. For ease of description, the packet obtained by performing one layer of decapsulation is recorded as a packet B. In this case, the foregoing process is as follows: The CPE removes, from the second target packet, the packet header that is encapsulated based on the wireless network protocol, to obtain the packet B. Then, the CPE removes, from the packet B, the packet header that is encapsulated based on the GRE protocol, to obtain the second original packet. The packet B is a packet obtained by removing the destination MAC address field and the source MAC address field from the fourth packet.

Removing a packet header of the second target packet is removing the receiver address field, the destination address field, and the source address field from the second target packet. Removing a packet header of the packet B is removing the protocol type field, the destination IP address field, the source IP address field, and the packet header type field from the packet B.

In a possible implementation, a process of removing the packet header of the second target packet includes: The CPE parses the second target packet to determine fields (that is, the receiver address field, the destination address field, and the source address field) corresponding to the packet header of the second target packet, and then removes the fields corresponding to the packet header of the second target packet, to remove the packet header of the second target packet. A process of removing the packet header of the packet B includes: The CPE parses the packet B to determine fields (that is, the protocol type field, the destination IP address field, the source IP address field, and the packet header type field) corresponding to the packet header of the packet B, and then removes the fields corresponding to the packet header of the packet B, to remove the packet header of the packet B.

For example, the wireless network protocol is the 802.11 protocol. In this case, packet headers in the second target packet include the 802.11 header and the GRE header. In this case, in a process of decapsulating the second target packet, the CPE first removes the 802.11 header from the second target packet, and then removes the GRE header from the second target packet, to obtain the second original packet. Therefore, the foregoing two decapsulation processes are as follows: After receiving the second target packet sent by the AP, the CPE removes the 802.11 header from the second target packet to obtain the packet B, and then removes the GRE header from the packet B to obtain the second original packet.

The schematic diagram of packet formats shown in FIG. 6 is still used as an example for description. In the packets shown in FIG. 6, a packet 605 is the second original packet that is obtained from the second target packet by the CPE.

The packet 605 and the packet 601 are a same packet. For a specific format of the packet 605, refer to Step 501.

It should be noted that, when the fourth packet is encapsulated to obtain the second target packet, the destination MAC address field and the source MAC address field in the packet header of the fourth packet are first removed, and then a packet header is encapsulated. Therefore, if the packet header of the second target packet is removed, an obtained packet is not a complete fourth packet, but a packet obtained by removing the destination MAC address field and the source MAC address field from the fourth packet. For ease of description, in this embodiment of this application, only the packet obtained by removing the destination MAC address field and the source MAC address field from the fourth packet is recorded as the packet B. In an actual implementation process, the packet B does not exist. The packet B is merely an intermediate product generated in a process in which the AP processes a packet, and there is no packet B in actual packet transmission.

512: The CPE sends the second original packet.

In a possible implementation, the CPE sends the second original packet to the first station device.

513: The first station device receives the second original packet from the CPE.

In the solution provided in this embodiment of this application, the AC performs one layer of encapsulation on the second original packet received from the second station device, and then the third packet obtained through encapsulation may be used for packet transmission. In this case, there is no need to perform a plurality of layers of encapsulation. The third packet obtained through encapsulation is sent to the AP. The AP obtains the second original packet from the received third packet, and then directly encapsulates the second original packet, to obtain the second target packet used for sending. Therefore, packet transmission efficiency is improved. Further, the solution in this embodiment of this application provides a new GRE tunnel establishment manner. In this manner, the GRE tunnel is established between the CPE and the AP, and the CAPWAP tunnel is established between the AP and the AC, so that only one layer of CAPWAP-tunnel encapsulation is needed for packet transmission between the AP and the AC. Therefore, transmission efficiency of an entire network is improved, and then a GRE tunnel capability of an entire system is improved. Moreover, in a conventional technology, establishment of the GRE tunnel needs to consume a tunnel table of the AC. The CPE is a terminal device, and there is usually a large quantity of CPEs. Therefore, overheads of tunnel tables in the AC are very high. Consequently, the CPE cannot be deployed in many scenarios. In contrast, in the solution provided in this embodiment of this application, the GRE tunnel is established only between the CPE and the AP, and no tunnel table of the AC is consumed. Therefore, the GRE tunnel can be deployed in more scenarios. This simplifies GRE deployment corresponding to the CPE, and reduces capital expenditure (CAPEX) costs of an enterprise.

It should be noted that, the processes shown in FIG. 3A and FIG. 3B and FIG. 5A and FIG. 5B are described merely by using an example in which the second station device directly communicates with the access controller. In more possible implementations, an access point device and a customer premises equipment that correspond to the second station device are further sequentially connected between the access controller and the second station device. In this case, for the process shown in FIG. 3A and FIG. 3B, after Step 313, that is, after the AC obtains the first original packet, the first original packet is processed based on a process similar to that in steps 503 to 512, so that the first original packet is transparently transmitted to the second station device. The second station device may receive the first original packet by performing Step 314. However, for the process shown in FIG. 5A and FIG. 5B, in Step 501 in which the second station device sends the second original packet, the second station device sends the second original packet to the customer premises equipment on a side of the second station device, and then processes the second original packet based on a process similar to that in steps 302 to 313, so that the access controller can obtain the second original packet. Then, the access controller processes the second original packet based on steps 502 to 513, to transparently transmit the second original packet.

Figure 7:
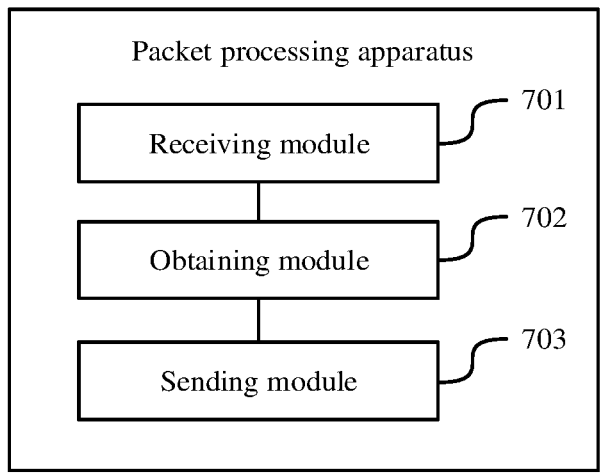
FIG. 7 is an example schematic diagram of a structure of a packet processing apparatus according to an embodiment of this application.

FIG. 7 is a schematic diagram of a structure of a packet processing apparatus according to an embodiment of this application. Refer to FIG. 7. The apparatus is used in an AC, and the apparatus includes:

a receiving module 701, configured to perform a process of receiving a first packet from a CPE in Step 307;

an obtaining module 702, configured to perform a process of obtaining a second packet from the first packet in Step 308, where the obtaining module 702 is further configured to: if a packet header of the second packet includes a target identifier, perform a process of obtaining a first original packet from the second packet in Step 309; and a sending module 703, configured to perform a process of sending a first target packet in Step 311.

The apparatus in this embodiment of this application provides a manner of setting, in the packet header of the second packet, the target identifier that indicates to decapsulate the packet. In this way, after the second packet is obtained from the first packet, the first original packet is obtained from the second packet when it is determined that the packet header of the second packet includes the target identifier. Then, one layer of encapsulation is directly performed on the first original packet, to obtain the first target packet used for sending. In this case, there is no need to perform a plurality of layers of encapsulation. Therefore, packet transmission efficiency is improved.

In a possible implementation, the target identifier is carried in a destination address field in the packet header, and the destination address field is a destination internet protocol IP address field or a destination media access control MAC address field.

In a possible implementation, the obtaining module 702 is configured to perform a specific process of obtaining the first original packet in Step 309.

In a possible implementation, the obtaining module 702 is configured to perform a specific process of obtaining the second packet in Step 308.

In a possible implementation, the first packet is encapsulated by using a wireless network protocol, the second packet includes a generic routing encapsulation GRE header, and the first target packet is encapsulated by using a control and provisioning of wireless access points CAPWAP protocol.

In a possible implementation, the receiving module 701 is further configured to perform a process of receiving a third packet from the AC in Step 505.

The obtaining module 702 is further configured to perform a process of obtaining a second original packet from the third packet in Step 506.

The sending module 703 is further configured to perform a process of sending a second target packet in Step 509.

In a possible implementation, the obtaining module 702 is configured to perform a specific process of obtaining the second original packet in Step 506.

In a possible implementation, the third packet is encapsulated by using the CAPWAP protocol, the fourth packet is encapsulated by using a GRE protocol, and the second target packet is encapsulated by using the wireless network protocol.

It should be noted that, when the packet processing apparatus provided in the foregoing embodiment processes a packet, division into the foregoing functional modules is merely used as an example for description. In actual application, the foregoing functions may be allocated to different functional modules for execution based on requirements. In other words, an internal structure of the AC is divided into different functional modules, to complete all or some of the functions described above. In addition, the packet processing apparatus provided in the foregoing embodiment and the packet processing method embodiments pertain to a same concept. For a specific implementation process thereof, refer to the method embodiments.

Figure 8:
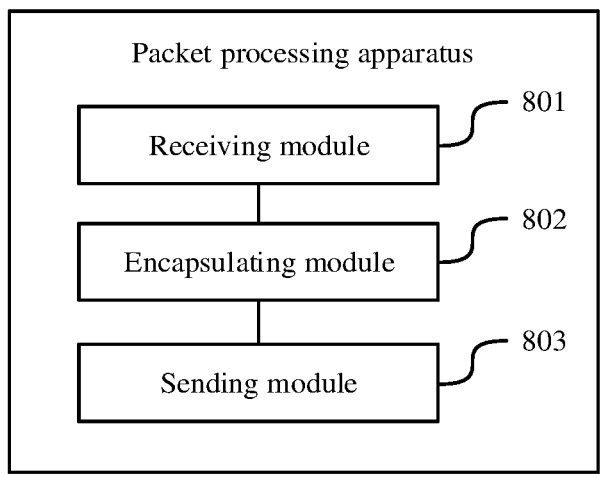
FIG. 8 is an example schematic diagram of a structure of a packet processing apparatus according to an embodiment of this application.

FIG. 8 is a schematic diagram of a structure of a packet processing apparatus according to an embodiment of this application. Refer to FIG. 8. The apparatus is used in a CPE, and the apparatus includes:
a receiving module 801, configured to perform a process of receiving a first original packet from a first station device in Step 302;
an encapsulating module 802, configured to perform a process of encapsulating the first original packet to obtain a first packet in steps 303 to 305; and
a sending module 803, configured to perform a process of sending the first packet in Step 306.

According to the apparatus provided in this embodiment of this application, when the first original packet sent by the first station device is encapsulated, a target identifier that indicates to decapsulate a packet is set in an encapsulated packet header, and then packet transmission is performed by sending a packet obtained through encapsulation. In this way, when determining that the packet header includes the target identifier, a device that receives the packet obtained through encapsulation can decapsulate the packet to obtain the first original packet, and then performs one layer of encapsulation on the first original packet, so that a packet obtained through one layer of encapsulated can be used in packet transmission. In this case, there is no need to perform a plurality of layers of encapsulation. Therefore, packet transmission efficiency is improved.

In a possible implementation, the target identifier is carried in a destination address field in the packet header of the second packet, and the destination address field is a destination IP address field or a destination MAC address field.

In a possible implementation, the encapsulating module 802 is configured to perform a specific process of encapsulating the first original packet in steps 303 to 305.

In a possible implementation, the second packet includes a GRE header, and the first packet is encapsulated by using a GRE protocol.

In a possible implementation, the receiving module 801 is further configured to perform a process of receiving a second target packet from an AP in Step 510.

The apparatus further includes:
an obtaining module, configured to perform a process of obtaining a second original packet from the second target packet in Step 511, where the second target packet is obtained by performing two layers of encapsulation on the second original packet.

The sending module 803 is further configured to perform a process of sending the second original packet in Step 512.

In a possible implementation, the obtaining module is configured to perform a specific process of obtaining the second original packet in Step 511.

In a possible implementation, the two layers of encapsulation include wireless network protocol encapsulation and GRE protocol encapsulation.

It should be noted that, when the packet processing apparatus provided in the foregoing embodiment processes a packet, division into the foregoing functional modules is merely used as an example for description. In actual application, the foregoing functions may be allocated to different functional modules for execution based on requirements. In other words, an internal structure of the CPE is divided into different functional modules, to complete all or some of the functions described above. In addition, the packet processing apparatus provided in the foregoing embodiment and the packet processing method embodiments pertain to a same concept. For a specific implementation process thereof, refer to the method embodiments.

In an example embodiment, a packet processing system is further provided, where the packet processing system includes a customer premises equipment CPE and an access point AP device.

The access point AP device is configured to: receive a first packet from the customer premises equipment CPE; obtain a second packet from the first packet; if a packet header of the second packet includes a target identifier, obtain a first original packet from the second packet, where the target identifier indicates to decapsulate the second packet; and send a first target packet, where the first target packet is obtained by encapsulating the first original packet.

In a possible implementation, the target identifier is carried in a destination address field in the packet header, and the destination address field is a destination internet protocol IP address field or a destination media access control MAC address field.

In a possible implementation, the access point AP device is further configured to: if the packet header of the second packet includes the target identifier, remove the packet header of the second packet to obtain the first original packet.

In a possible implementation, the access point AP device is further configured to remove a packet header of the first packet to obtain the second packet.

In a possible implementation, the first packet is encapsulated by using a wireless network protocol, the second packet includes a generic routing encapsulation GRE header, and the first target packet is encapsulated by using a control and provisioning of wireless access points CAPWAP protocol.

In a possible implementation, the access point AP device is further configured to: receive a third packet from an access controller AC; obtain a second original packet from the third packet; and send a second target packet, where the second target packet is obtained by encapsulating a fourth packet, and the fourth packet is obtained by encapsulating the second original packet.

In a possible implementation, the access point AP device is further configured to remove a packet header of the third packet to obtain the second original packet.

In a possible implementation, the third packet is encapsulated by using the CAPWAP protocol, the fourth packet is encapsulated by using a GRE protocol, and the second target packet is encapsulated by using the wireless network protocol.

The customer premises equipment CPE is configured to: receive a first original packet from a first station device; encapsulate the first original packet to obtain the first packet, where the first packet includes the second packet, the packet header of the second packet includes the target identifier, and the target identifier indicates to decapsulate the second packet; and send the first packet.

In a possible implementation, the target identifier is carried in the destination address field in the packet header of the second packet, and the destination address field is the destination IP address field or the destination MAC address field.

In a possible implementation, the customer premises equipment CPE is further configured to: encapsulate an intermediate packet header for the first original packet, where a destination address field in the intermediate packet header carries the target identifier; remove a destination MAC address field and a source MAC address field from the intermediate packet header to obtain the second packet; and encapsulate a first packet header for the second packet to obtain the first packet.

In a possible implementation, the second packet includes the GRE header, and the first packet is encapsulated by using the wireless network protocol.

In a possible implementation, the customer premises equipment CPE is further configured to: receive the second target packet from the access point AP device; obtain the second original packet from the second target packet, where the second target packet is obtained by performing two layers of encapsulation on the second original packet; and send the second original packet.

In a possible implementation, the customer premises equipment CPE is further configured to remove two packet headers of the second target packet to obtain the second original packet.

In a possible implementation, the two layers of encapsulation include wireless network protocol encapsulation and GRE protocol encapsulation.

In more possible implementations, the packet processing system further includes the access controller AC. For a function of the access controller AC, refer to the embodiments corresponding to FIG. 3A and FIG. 3B and FIG. 5A and FIG. 5B.

The following separately describes structures of devices in the packet processing system.

Figure 9:
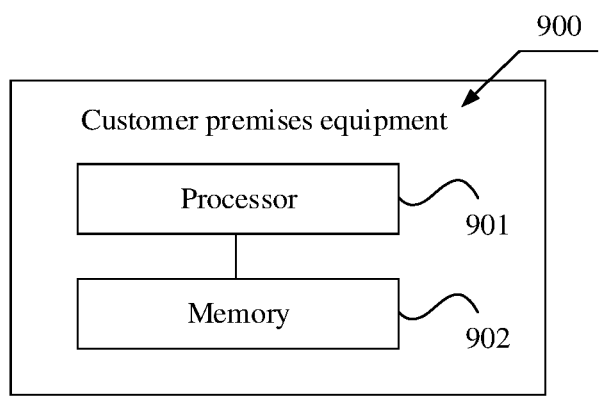
FIG. 9 is an example schematic diagram of a structure of a customer premises equipment 900 according to an embodiment of this application.

FIG. 9 is a schematic diagram of a structure of a customer premises equipment 900 according to an embodiment of this application. Refer to FIG. 9. The customer premises equipment 900 may differ greatly due to different configurations or performance. In a possible implementation, the customer premises equipment 900 includes one or more processors (central processing units, CPUs) 901 and one or more memories 902. The one or more memories 902 store at least one piece of program code. The at least one piece of program code is loaded and executed by the one or more processors 901 to implement a processing process corresponding to a CPE in the packet processing method provided in the foregoing method embodiments. In more possible implementations, the customer premises equipment 900 has components such as a wired or wireless network interface, a keyboard, and an input/output interface, to perform input/output. Optionally, the customer premises equipment 900 includes another component configured to implement a device function.

Figure 10:
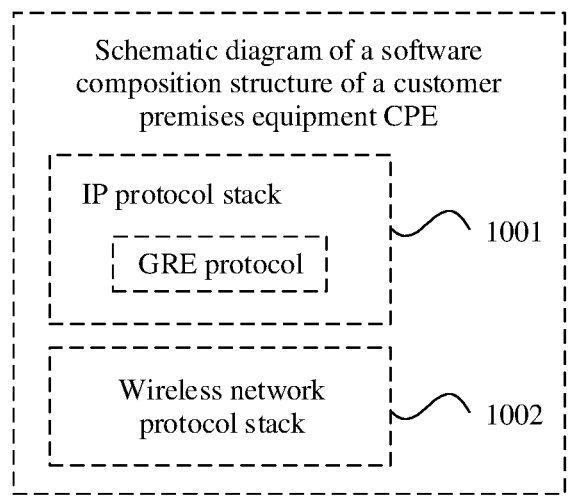
FIG. 10 is an example schematic diagram of a software composition structure of a customer premises equipment according to an embodiment of this application.

It should be noted that, compared with an existing customer premises equipment, the customer premises equipment 900 provided in this embodiment of this application has a better software structure and a better feature. Refer to FIG. 10. FIG. 10 is a schematic diagram of a software composition structure of a customer premises equipment according to an embodiment of this application. Software composition of the customer premises equipment 900 includes an IP protocol stack 1001 and a wireless network protocol stack 1002. The wireless network protocol stack 1002 is an 802.11 protocol stack. Optionally, the wireless network protocol stack 1002 is of another type. This is not limited in this embodiment of this application. In the solution provided in this embodiment of this application, a GRE protocol is added to the IP protocol stack 1001, and the added GRE protocol is modified, so that the added GRE protocol supports setting a destination address field in a packet header to a target identifier. In this way, a modified GRE protocol implements the packet processing process corresponding to the CPE in the packet processing method provided in the foregoing method embodiments.

Figure 11:
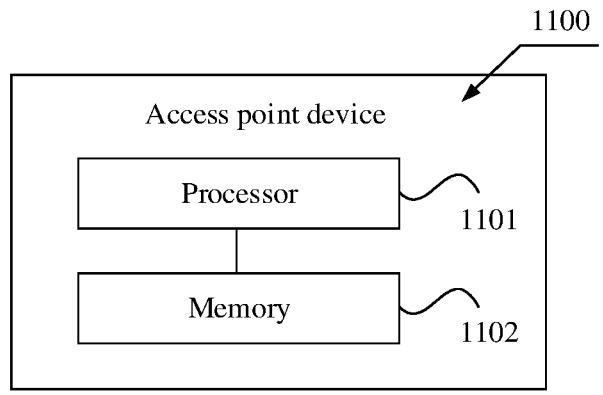
FIG. 11 is an example schematic diagram of a structure of an access point device 1110 according to an embodiment of this application.

FIG. 11 is a schematic diagram of a structure of an access point device 1110 according to an embodiment of this application. Refer to FIG. 11. The access point device 1100 may differ greatly due to different configurations or performance. In a possible implementation, the access point device 1100 includes one or more processors (CPUs) 1101 and one or more memories 1102. The one or more memories 1102 store at least one piece of program code. The at least one piece of program code is loaded and executed by the one or more processors 1101 to implement a packet processing process corresponding to an AP in the packet processing method provided in the foregoing method embodiments. In more possible implementations, the access point device 1100 has components such as a wired or wireless network interface and an input/output interface, to perform input/output. Optionally, the access point device 1100 includes another component configured to implement a device function.

Figure 12:
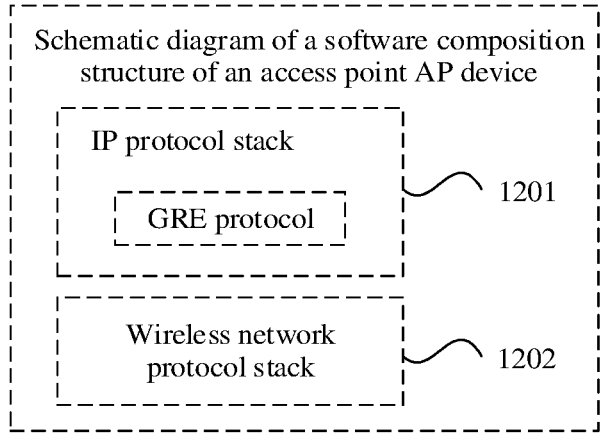
FIG. 12 is an example schematic diagram of a software composition structure of an access point device according to an embodiment of this application.

It should be noted that, compared with an existing access point device, the access point device 1100 provided in this embodiment of this application has a better software structure and a better feature. Refer to FIG. 12. FIG. 12 is a schematic diagram of a software composition structure of an access point device according to an embodiment of this application. Software composition of the access point device 1000 includes an IP protocol stack 1201 and a wireless network protocol stack 1202. The wireless network protocol stack 1202 is an 802.11 protocol stack. Optionally, the wireless network protocol stack 1202 is of another type. This is not limited in this embodiment of this application. In the solution provided in this embodiment of this application, a GRE protocol is added to the IP protocol stack 1201, and the added GRE protocol is modified. In this way, when a destination address field in a packet header of the received packet includes a target identifier, the added GRE protocol supports decapsulating a received packet and removing a GRE header of the received packet. In this way, the packet processing process corresponding to the AP in the packet processing method provided in the foregoing method embodiments is implemented by using a modified GRE protocol.

Figure 13:
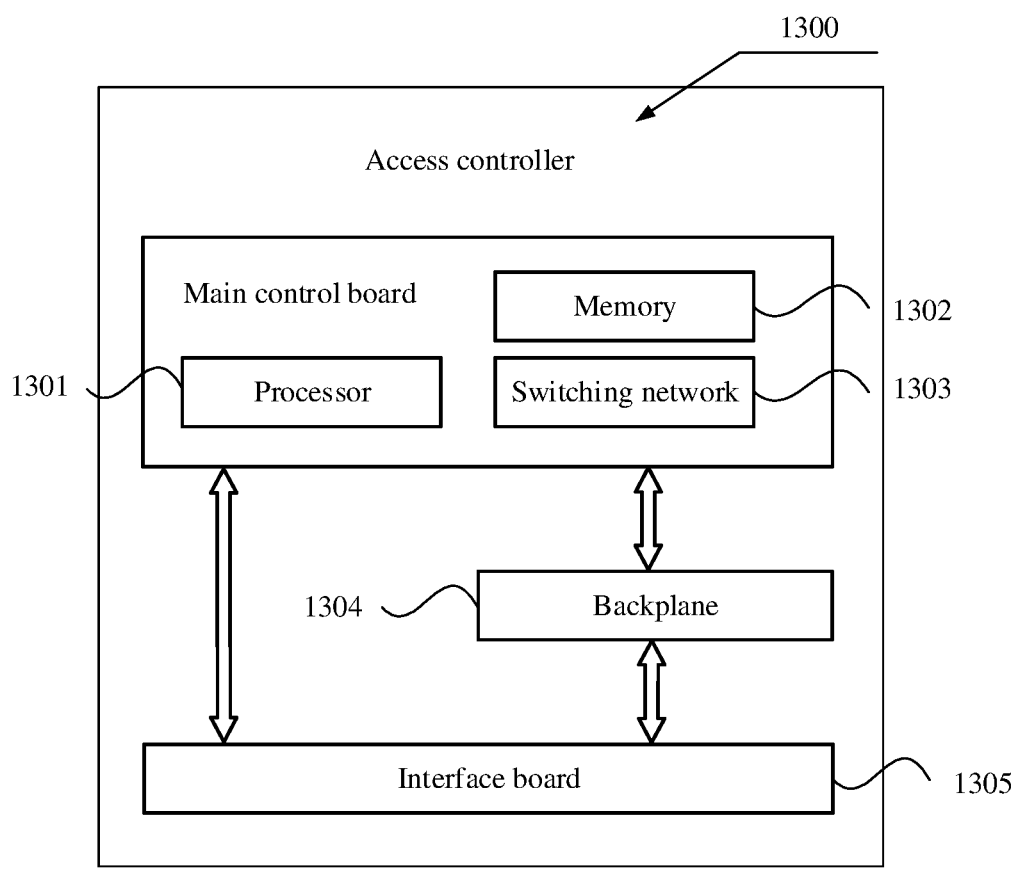
FIG. 13 is an example schematic diagram of a structure of an access controller 1300 according to an embodiment of this application.

FIG. 13 is a schematic diagram of a structure of an access controller 1300 according to an embodiment of this application. Refer to FIG. 13. The access controller 1300 may differ greatly due to different configurations or performance. In a possible implementation, the access controller 1300 includes one or more processors (CPUs) 1301, one or more memories 1302, a switching network 1303, a backplane 1304, and an interface board 1305. The one or more processors 1301 are mainly configured to perform task scheduling and a communication process that is based on data forwarding control, including control plane communication and forwarding plane communication of a network, such as data encapsulation and decapsulation, and traffic forwarding information query. The memory 1302 is configured to store and exchange various types of data or software, including user access information and forwarding device information that are used during network communication. The switching network 1303 and the interface board 1305 cooperate with each other through the backplane 1304 to implement a process of the packet processing method in the foregoing method embodiments. In this way, network data forwarding is implemented. In more possible implementations, the access controller 1300 includes another component configured to implement a device function.

An example embodiment further provides a computer-readable storage medium, such as a memory including instructions. The instructions may be executed by a processor, to implement a data processing method in the foregoing embodiments. For example, the computer-readable storage medium is a read-only memory (ROM), a random access memory (RAM), a compact disc read-only memory (CD-ROM), a magnetic tape, a floppy disk, or an optical data storage device. Optionally, the computer-readable storage medium is of another type. This is not limited in this embodiment of this application.

In an example embodiment, a computer program product is further provided. When the computer program product is run on an access point AP device, the access point AP device is enabled to perform a method step that is of the packet processing method and that is performed by the AP in the embodiments corresponding to FIG. 3A and FIG. 3B and FIG. 5A and FIG. 5B. Alternatively, when the computer program product is run on a customer premises equipment CPE, the customer premises equipment CPE is enabled to perform a method step that is of the packet processing method and that is performed by the CPE in the embodiments corresponding to FIG. 3A and FIG. 3B and FIG. 5A and FIG. 5B.

In an example embodiment, a chip is further provided. The chip includes a processing circuit and an input/output interface that is internally connected to and communicates with the processing circuit. The processing circuit and the input/output interface each are configured to implement a method step that is of the packet processing method and that is performed by an AP in the embodiments corresponding to FIG. 3A and FIG. 3B and FIG. 5A and FIG. 5B. Alternatively, the processing circuit and the input/output interface each are configured to implement a method step that is of the packet processing method and that is performed by a CPE in the embodiments corresponding to FIG. 3A and FIG. 3B and FIG. 5A and FIG. 5B.

In some possible embodiments, the chip is implemented by using the following structure: one or more field programmable gate arrays (FPGA), a programmable logic device (PLD), a complex programmable logic device (CPLD), a controller, an application-specific integrated circuit (ASIC), a state machine, gate logic, a discrete hardware component, a transistor logic device, a network processor (NP), any other suitable circuit, or any combination of circuits that can perform various functions described in this application.

The sequence numbers in the foregoing embodiments of this application are merely for description, and are not intended to indicate priorities of the embodiments.

A person of ordinary skill in the art may understand that all or some of the steps in the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A packet processing method performed by an access point (AP) device, the method comprising:
    receiving a first packet from customer premises equipment (CPE), wherein the first packet is encapsulated by using a wireless network protocol;
    removing a packet header of the first packet to obtain a second packet from the first packet;
    removing a packet header of the second packet to obtain a first original packet from the second packet based on the packet header of the second packet including a target identifier, wherein the target identifier indicates to decapsulate the second packet, and the second packet includes a generic routing encapsulation (GRE) header; and
    sending a first target packet to an access controller (AC), wherein the first target packet is obtained by encapsulating the first original packet, and the first target packet is encapsulated by using a control and provisioning of wireless access points (CAPWAP) protocol.

2. The method according to claim 1, wherein the target identifier is carried in a destination address field in the packet header of the second packet, and the destination address field is a destination internet protocol (IP) address field or a destination media access control (MAC) address field.

3. The method according to claim 1, further comprising:
    receiving a third packet from the AC;
    obtaining a second original packet from the third packet; and
    sending a second target packet, wherein the second target packet is obtained by encapsulating a fourth packet, and the fourth packet is obtained by encapsulating the second original packet.

4. The method according to claim 3, wherein the third packet is encapsulated by using the CAPWAP protocol, the fourth packet is encapsulated by using the GRE protocol, and the second target packet is encapsulated by using the wireless network protocol.

5. The method according to claim 1, wherein one layer of encapsulation is directly performed on the first original packet to obtain the first target packet.

6. A packet processing method performed by customer premises equipment (CPE), the method comprising:
    receiving a first original packet from a first station device;
    encapsulating the first original packet to obtain a first packet, wherein
        the first packet includes a second packet,
        a packet header of the second packet includes a target identifier, the target identifier indicates to decapsulate the second packet,
the second packet includes a generic routing encapsulation (GRE) header, and
the first packet is encapsulate by using a wireless network protocol, wherein
encapsulating the first original pack first packet comprises:
encapsulating an intermediate packet header for the first original packet, wherein a destination address field in the intermediate packet header carries the get identifier;
removing a destination media access control (MAC) address field and a source MAC address field from the intermediate packet header to obtain the second packet; and
encapsulating a first packet header for the second packet to obtain the first packet; and
sending the first packet to an access point (AP) device.

7. The method according to claim 6, wherein the target identifier is carried in a destination address field in the packet header of the second packet, and the destination address field is a destination internet protocol (IP) address field or the destination MAC address field.

8. The method according to claim 6, further comprising:
receiving a second target packet from the AP device;
obtaining a second original packet from the second target packet, wherein the second target packet is obtained by performing two layers of encapsulation on the second original packet; and
sending the second original packet.

9. The method according to claim 8, wherein the two layers of encapsulation include wireless network protocol encapsulation and GRE protocol encapsulation.

10. The method according to claim 6, wherein one layer of encapsulation is directly performed on the first original packet to obtain the first packet.

11. An access point device, comprising:
a processor; and
a memory configured to store computer readable instructions that, when executed by the processor, cause the access point device to:
receive a first packet from customer premises equipment (CPE), wherein the first packet is encapsulated by using a wireless network protocol;
remove a packet header of the first packet to obtain a second packet from the first packet;
remove a packet header of the second packet to obtain a first original packet from the second packet based on the packet header of the second packet including a target identifier, wherein the target identifier indicates to decapsulate the second packet, and the second packet includes a generic routing encapsulation (GRE) header; and
send a first target packet to an access controller (AC), wherein the first target packet is obtained by encapsulating the first original packet, and the first target packet is encapsulated by using a control and provisioning of wireless points (CAPWAP) protocol.

12. The access point device according to claim 11, wherein the target identifier is carried in a destination address field in the packet header of the second packet, and the destination address field is a destination internet protocol (IP) address field or a destination media access control (MAC) address field.

13. The access point device according to claim 11, wherein the access point device is further caused to:
receive a third packet from the AC;
obtain a second original packet from the third packet; and
send a second target packet, wherein the second target packet is obtained by encapsulating a fourth packet, and the fourth packet is obtained by encapsulating the second original packet.

14. The access point device according to claim 11, wherein one layer of encapsulation is directly performed on the first original packet to obtain the first target packet.

15. A customer premises equipment, comprising:
a processor; and
a memory configured to store computer readable instructions that, when executed by the processor, cause the customer premises equipment to:
receive a first original packet from a first station device;
encapsulate the first original packet to obtain a first packet, wherein
the first packet includes a second packet,
a packet header of the second packet includes a target identifier,
the target identifier indicates to decapsulate the second packet,
the second packet includes a generic routing encapsulation (GRE) header, and
the first packet is encapsulated by using a wireless network protocol, wherein
encapsulating the first original packet to obtain the first packet comprises:
encapsulating an intermediate packet header for the first original packet, wherein a destination address field in the intermediate packet header carries the target identifier;
removing a destination media access control (MAC) address field and a source MAC address field from the intermediate packet header to obtain the second packet, and
encapsulating a first packet header for the second packet to obtain the first packet; and
send the first packet to an access point (AP) device.

16. The customer premises equipment according to claim 15, wherein the target identifier is carried in a destination address field in the packet header of the second packet, and the destination address field is a destination internet protocol (IP) address field or the destination MAC address field.

17. The customer premises equipment according to claim 15, wherein the customer premises equipment is configured to receive a second target packet from the AP device; and the customer premises equipment is further caused to:
obtain a second original packet from the second target packet, wherein the second target packet is obtained by performing two layers of encapsulation on the second original packet; and
send the second original packet.

18. The customer premises equipment according to claim 15, wherein one layer of encapsulation is directly performed on the first original packet to obtain the first packet.

* * * * *